(12) United States Patent
Joye et al.

(10) Patent No.: US 9,479,013 B2
(45) Date of Patent: Oct. 25, 2016

(54) WIRELESS INDUCTIVE POWER TRANSFER

(71) Applicant: KONINKLIJKE PHILIPS N.V., Eindhoven (NL)

(72) Inventors: Neil Francis Joye, Waalre (NL); Andries Van Wageningen, Wulre (NL); Wilhelmus Gerardus Maria Ettes, Leeuwarden (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/432,574

(22) PCT Filed: Aug. 6, 2014

(86) PCT No.: PCT/EP2014/066911
§ 371 (c)(1),
(2) Date: Mar. 31, 2015

(87) PCT Pub. No.: WO2015/018868
PCT Pub. Date: Feb. 12, 2015

(65) Prior Publication Data
US 2016/0181818 A1 Jun. 23, 2016

(30) Foreign Application Priority Data
Aug. 7, 2013 (EP) .................................. 13179524

(51) Int. Cl.
*H01F 27/42* (2006.01)
*H01F 37/00* (2006.01)
*H01F 38/00* (2006.01)
*H02J 5/00* (2016.01)
*H04B 5/00* (2006.01)
(Continued)

(52) U.S. Cl.
CPC ............... *H02J 50/60* (2016.02); *H01F 38/14* (2013.01); *H02J 5/005* (2013.01); *H02J 7/025* (2013.01); *H04B 5/0037* (2013.01)

(58) Field of Classification Search
CPC .......... H02J 50/00; H02J 50/60; H02J 5/005; H02J 7/025; H02J 17/00; H01F 38/14
USPC ....................................................... 307/104
See application file for complete search history.

(56) References Cited

U.S. PATENT DOCUMENTS

2007/0228833 A1   10/2007 Stevens
2013/0288600 A1*  10/2013 Kuusilinna ........... H02J 7/0004
                                                            455/41.2

FOREIGN PATENT DOCUMENTS

WO    WO2013046104 A1    4/2013

OTHER PUBLICATIONS

Waffenschmidt E. "Wireless Power for Mobile Devices", Telecommunications Energy Conference (INTELEC), 2011 IEEE 33rd International, IEEE, Oct. 9, 2011, pp. 1-9, XP032071351.
(Continued)

*Primary Examiner* — Carlos Amaya
(74) *Attorney, Agent, or Firm* — Larry Liberchuk

(57) ABSTRACT

A wireless power transfer system includes a power receiver (105) and a power transmitter (101) generating a wireless inductive power transfer signal for powering the power receiver (105) during a power transfer phase. An apparatus, often the power transmitter (101) comprises a first communication unit (305) communicating with a second communication unit of an entity using an electromagnetic communication signal. The entity may typically be the power receiver (105). The apparatus comprises a reference processor (307) for measuring and storing a reference value of a characteristic of the communication signal and a measurement unit (309) which repeatedly during the power transfer phase determines a measured value of the characteristic. A comparator (311) compares the measured values to the reference value and an initiator (313) triggers an entity detection process if the comparison indicates that a measured value and the reference value do not meet a similarity criterion. The entity detection process detect a presence of another entity.

18 Claims, 10 Drawing Sheets

(51) Int. Cl.
*H02J 7/02* (2016.01)
*H01F 38/14* (2006.01)

(56) References Cited

OTHER PUBLICATIONS

"System Description Wireless Power Transfer", Internet Citation, Oct. 1, 2010, pp. 1-76, XP008158253, Retrieved from the Internet: URL:http://www.y-adagio.com/public/committees/iec_tc100_ags/meetings/29/100ags438.pdf [retrieved on Nov. 21, 2012].

"System Description Wireless Power Transfer", vol. 1: Low power, Part 1: Interface Definition, v 1.1.1, Jul. 2012.

"Cordless Kitchen Appliances—A powerful new kitchen concept," Wireless Power Consortium, White Paper, Draft v0.8, Apr. 2013.

NFC Activity Specification, Technical Specification, Version 1.0, NFC Forum, Nov. 18, 2010.

AN1445, "Antenna Design Guide for MRFC52x, PN51x and PN53x", NXP Semiconductors, Rev. 1.2, Oct. 11, 2010.

\* cited by examiner

WIRELESS INDUCTIVE POWER TRANSFER

FIELD OF THE INVENTION

The invention relates to inductive power transfer and in particular, but not exclusively, to an inductive power transfer system compatible with the Qi wireless power transfer standard.

BACKGROUND OF THE INVENTION

Many systems require a wiring and/or electrical contacts in order to supply electrical power to devices. Omitting these wires and contacts provides for an improved user experience. Traditionally, this has been achieved using batteries located in the devices but this approach has a number of disadvantages including extra weight, bulk and the need to frequently replace or recharge the batteries. Recently, the approach of using wireless inductive power transfer has received increasing interest.

Part of this increased interest is due to the number and variety of portable and mobile devices having exploded in the last decade. For example, the use of mobile phones, tablets, media players etc. has become ubiquitous. Such devices are generally powered by internal batteries and the typical use scenario often requires recharging of batteries or direct wired powering of the device from an external power supply.

As mentioned, most present day devices require a wiring and/or explicit electrical contacts to be powered from an external power supply. However, this tends to be impractical and requires the user to physically insert connectors or otherwise establish a physical electrical contact. It also tends to be inconvenient to the user by introducing lengths of wire. Typically, power requirements also differ significantly, and currently most devices are provided with their own dedicated power supply resulting in a typical user having a large number of different power supplies with each power supply being dedicated to a specific device. Although, internal batteries may prevent the need for a wired connection to an external power supply, this approach only provides a partial solution as the batteries will need recharging (or replacing which is expensive). The use of batteries may also add substantially to the weight and potentially cost and size of the devices.

In order to provide a significantly improved user experience, it has been proposed to use a wireless power supply wherein power is inductively transferred from a transmitter coil in a power transmitter device to a receiver coil in the individual devices.

Power transmission via magnetic induction is a well-known concept, mostly applied in transformers which have a tight coupling between the primary transmitter coil and the secondary receiver coil. By separating the primary transmitter coil and the secondary receiver coil between two devices, wireless power transfer between the devices becomes possible based on the principle of a loosely coupled transformer.

Such an arrangement allows a wireless power transfer to the device without requiring any wires or physical electrical connections. Indeed, it may simply allow a device to be placed adjacent to, or on top of, the transmitter coil in order to be recharged or powered externally. For example, power transmitter devices may be arranged with a horizontal surface on which a device can simply be placed in order to be powered.

Furthermore, such wireless power transfer arrangements may advantageously be designed such that the power transmitter device can be used with a range of power receiver devices. In particular, a wireless power transfer standard known as the Qi standard has been defined and is currently being developed further. This standard allows power transmitter devices that meet the Qi standard to be used with power receiver devices that also meet the Qi standard without these having to be from the same manufacturer or having to be dedicated to each other. The Qi standard further includes some functionality for allowing the operation to be adapted to the specific power receiver device (e.g. dependent on the specific power drain).

The Qi standard is developed by the Wireless Power Consortium and more information can e.g. be found on their website: http://www.wirelesspowerconsortium.com/index.html, where in particular the defined Standards documents can be found.

In order to support the interworking and interoperability of power transmitters and power receivers, it is preferable that these devices can communicate with each other, i.e. it is desirable if communication between the power transmitter and power receiver is supported, and preferably if communication is supported in both directions.

The Qi standard supports communication from the power receiver to the power transmitter thereby enabling the power receiver to provide information that may allow the power transmitter to adapt to the specific power receiver. In the current standard, a unidirectional communication link from the power receiver to the power transmitter has been defined and the approach is based on a philosophy of the power receiver being the controlling element. To prepare and control the power transfer between the power transmitter and the power receiver, the power receiver specifically communicates information to the power transmitter.

The unidirectional communication is achieved by the power receiver performing load modulation wherein a loading applied to the secondary receiver coil by the power receiver is varied to provide a modulation of the power signal. The resulting changes in the electrical characteristics (e.g. variations in the current draw) can be detected and decoded (demodulated) by the power transmitter. In this approach, the power transfer signal is essentially used as a carrier which is modulated by the power receiver, i.e. by modulating a load on the power receiver coil by e.g. switching on and off an impedance that is connected to the power receiver coil.

However, a limitation of the Qi system is that it does not support communication from the power transmitter to the power receiver. In order to address this, various communication approaches have been proposed. For example, it has been proposed to communicate data from the power transmitter to the power receiver by modulating the power transfer signal with a suitable signal representing the data to be transmitted. E.g. small frequency variations representing the data may be superposed on the power transfer signal.

In general, communication between power receiver and power transmitter is faced with multiple challenges and difficulties. In particular, there is typically a conflict between the requirements and characteristics for the power signal in transferring power and the requirements and preferences for the communication. Typically, the system requires close interaction between the power transfer and communication functions. For example, the system is designed based on the concept of only one signal being inductively coupled between the transmitter and the power receiver, namely the power signal itself. However, using the power signal itself for not only performing a power transfer but also for carrying information results in difficulties due to the varying operating characteristics.

As a specific example, using a load modulation approach wherein the power receiver communicates data by modulating the load of the power signal (such as in the Qi system) requires that the normal load is relatively constant. However, this cannot be guaranteed in many applications.

E.g., if wireless power transfer is to be used to power a motor driven appliance (such as e.g. a blender), the motor current tends to be quite erratic and discontinuous. Indeed, when a motor driven appliance draws current, the amplitude of the current is strongly related to the load of the motor. If the motor load is changing, the motor current is changing as well. This results in the amplitude of the current in the transmitter also changing with the load. This load variation will interfere with the load modulation, resulting in degraded communication. Indeed, in practice it is typically very difficult to detect load modulation for loads that include a motor as part of the load. Therefore, in such scenarios, the number of communication errors is relatively high or the communication may utilize a very high data symbol energy, thereby reducing the possible data rate very substantially.

In order to address the problems with load modulation, it has been proposed to use a separate and independent communication link from the power receiver to the power transmitter. Such an independent communication link may provide a data path from the power receiver to the power transmitter which is substantially independent of the power transfer operation and dynamic variations. It may also provide a higher bandwidth and often a more robust communication.

However, there are also disadvantages associated with using an independent communication link. For example, the use of separate communication channels could result in interference between the operations of different power transfers which could result in a potentially dangerous situation with high power levels. For example, the control operations may interfere with each other, e.g. by the control data from the power receiver of one power transfer operation being used to control the power transfer to another nearby power receiver The separation between communication and power transfer signals may result in less robust and less fail safe operation.

Another potential problem with wireless power transfer is that power may unintentionally be transferred to unintended e.g. metallic objects. For example, if a foreign object, such as e.g. a coin, key, ring etc., is placed upon the power transmitter platform arranged to receive a power receiver, the magnetic flux generated by the transmitter coil will introduce eddy currents in the metal objects which will cause the objects to heat up. The heat increase may be very significant and may indeed result in a risk of pain and damage to humans subsequently picking up the objects.

Experiments have shown that metal objects positioned at the surface of a power transmitter can reach an undesired high temperature (higher than 60° C.) at normal environment temperatures (20° C.) even for power dissipation in the object being as low as 500 mW. For comparison, skin burning caused by contact with hot objects starts at temperatures of around 65° C. The experiments have indicated that a power absorption of 500 mW or more in a typical foreign object rises its temperature to an unacceptable level.

In order to prevent such scenarios, it has been proposed to introduce foreign object detection where the power transmitter can detect the presence of a foreign object and reduce the transmit power. For example, the Qi system includes functionality for detecting a foreign object, and for reducing power if a foreign object is detected.

The power dissipation in a foreign object can be estimated from the difference between transmitted and received power. In order to prevent that too much power is dissipated in a foreign object, the transmitter can terminate the power transfer if the power loss exceeds a threshold.

In the current Qi Standard the preferred approach is to determine the power loss across the interface between the power transmitter and the power receiver in order to determine any loss in foreign objects. For this purpose, the power receiver estimates the amount of power that enters its interface surface—i.e. the received power. In order to generate the estimate, the power receiver measures the amount of power provided to the load, and adds an estimate of the losses in components—coil, resonant capacitor, rectifier, etc., as well as losses in conductive elements of the device, such as in metal parts that are not exposed to the user. The power receiver communicates the determined received power estimate to the power transmitter at regular intervals.

The power transmitter estimates the amount of power extracted from the power signal—i.e. the transmitted power. The power transmitter can then calculate the difference between the transmitted power and the received power, and if the difference exceeds a given level, the power transmitter may determine that a situation has occurred where an unacceptable power may be dissipated in a foreign object. For example, a foreign object may be positioned on or near the power transmitter resulting in this being heated due to the power signal. If the power loss exceeds a give threshold, the power transmitter terminates the power transfer in order to prevent the object from getting too hot. More details can be found in the Qi Standard, System Description Wireless power.

When performing this power loss detection, it is important that the power loss is determined with sufficient accuracy to ensure that the presence of a foreign object is detected. Firstly, it must be ensured that a foreign object which absorbs significant power from the magnetic field is detected. In order to ensure this, any error in estimating the power loss calculated from the transmitted and received power must be less than the acceptable level for power absorption in a foreign object. Similarly, in order to avoid false detections, the accuracy of the power loss calculation must be sufficiently accurate to not result in estimated power loss values that are too high when no foreign object is present.

It is substantially more difficult to determine the transmitted and received power estimates sufficiently accurately at higher power levels than for lower power levels. For example, assuming that an uncertainty of the estimates of the transmitted and received power is ±3%, this can lead to an error of ±150 mW at 5 W transmitted and received power, and
±1.5 W at 50 W transmitted and received power.

Thus, whereas such accuracy may be acceptable for a low power transfer operation it is not acceptable for a high power transfer operation.

Typically, it is required that the power transmitter must be able to detect power consumption of foreign objects of only 350 mW or even lower. This requires very accurate estimation of the received power and the transmitted power. This is particularly difficult at high power levels, and frequently it is difficult for power receivers to generate estimates that are sufficiently accurate. However, if the power receiver overestimates the received power, this can result in power consumption by foreign objects not being detected. Conversely, if the power receiver underestimates the received power, this may lead to false detections where the power transmitter terminates the power transfer despite no foreign objects being present.

Thus, the current approaches for foreign object detection and communication may be suboptimal and have some associated disadvantages.

Accordingly, an improved power transfer system would be advantageous and in particular a system allowing improved communication support, increased reliability, increased flexibility, facilitated implementation, reduced sensitivity to load variations, improved safety, improved foreign object detection, and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided an apparatus for a wireless power transfer system including a power transmitter and a power receiver, the power transmitter being arranged to generate a wireless inductive power transfer signal for powering the power receiver during a power transfer phase, the apparatus comprising: a first communication unit for communicating with a second communication unit of a first entity using an electromagnetic communication signal, the first entity being one of the power receiver and the power transmitter; a reference processor for measuring and storing a reference value of a characteristic of the communication signal; a measurement unit for repeatedly during the power transfer phase determining a measured value of the characteristic of the communication signal; a comparator for comparing the measured values to the reference value; and an initiator for triggering an entity detection process if the comparison indicates that a measured value and the reference value do not meet a similarity criterion, the entity detection process being arranged to detect a presence of an entity other than the first entity.

The invention may provide improved communication and/or improved, more reliable or even potentially safer operation in many power transfer systems.

The approach may specifically in many scenarios utilize the existence of a communication channel separate from the power transfer signal to detect the possibility of other entities being present which may negatively affect or be negatively affected by the power transfer.

As a specific example, the approach may provide an approach for detecting a possible presence of other communication units which result in a conflict or interference between data for different power transfer operations. For example, for a power transmitter, the approach may allow a possible detection of the presence of a different power receiver than the one being powered by the power transmitter. The presence of such a power receiver may result in data that is received by the power transmitter, and which is thought to have been transmitted from the powered power receiver, in fact has originated from a power receiver that is not part of the power transfer. This may result in unintended power transfer operation.

As another example, the approach may allow a way of potentially detecting the possibility of a foreign object, such as a conductive element, being present. The power transfer signal may result in currents being induced in such an element resulting in excessive power dissipation and resulting heating of the foreign object.

The approach may specifically detect unexpected variations in the communication signal which may potentially be due to a foreign object or another power receiver/power transmitter being introduced to the power transfer environment. The system may accordingly initialize an entity detection process which seeks to determine whether other unintended entities are indeed present or not. The evaluation of the changes in the characteristic of the communication signal during power transfer may provide an indication of a potential risk that an unintended entity has been introduced to the environment. However, by using this detection to trigger an entity detection process that may e.g. detect other communication units or foreign objects, a substantially more reliable detection may be achieved in many embodiments thereby resulting in improved performance. The entity detection process may for example be performed during specific test conditions or use approaches and algorithms that are not suitable for continuous use during the power transfer phase.

The electromagnetic communication signal may e.g. be any signal which is exchanged between the first communication unit and the second communication unit, and may specifically be an RF signal generated by either the first communication unit or the second communication unit, and modulated by either the first communication unit or the second communication unit. For example, the communication signal may be a carrier signal generated by the first communication unit, and modulated by the first communication unit (e.g. by amplitude, frequency or phase modulation) or by the second communication unit (e.g. by load modulation). In some embodiments, the communication signal may be generated by the second communication unit, and e.g. modulated by the second communication unit (e.g. by amplitude, frequency or phase modulation).

In many embodiments, the communication signal may be a signal transmitted by an antenna of the first or second communication unit and/or a signal received by an antenna of the first or second communication unit.

The reference value and the measured value may represent the same property of the communication signal, such as e.g. be an indication of a signal strength thereof. The characteristic of the communication signal may be any characteristic which may be affected by the presence of another entity.

If the entity detection process indicates the presence of an entity other than the first entity, the apparatus may proceed as appropriate depending on the specific preferences and requirements of the individual embodiment. In many embodiments, the apparatus may inhibit the power transfer in response to such a detection, e.g. by terminating the power transfer phase, not entering (or continuing) a power transfer (phase), or by limiting the power of the power transfer signal during the power transfer phase.

If the apparatus is a power transmitter, the first entity may be a power receiver. If the apparatus is a power receiver, the first entity may be a power transmitter.

In accordance with an optional feature of the invention, the apparatus further comprises a detector arranged to perform the entity detection process, and wherein the entity detection process comprises a detection of a third communication unit.

The entity detection process may be a detection of communication units available for communication with the first communication unit. Specifically, the entity detection process may detect which potential communication candidates are available for the first communication unit. The entity detection process may specifically detect whether the only possible communication candidate available for the first communication unit is the second communication unit. If more (i.e. at least a third) communication unit is available for communication, the detection of such a (third) communication unit by the entity detection process may result in the power transfer being inhibited.

The approach may reduce the risk of the first communication unit communicating with unintended other parties. Thus, the confidence that the communication by the first communication unit is indeed with the corresponding power transmitter or power receiver involved in the power transfer may be increased.

The entity detection process may specifically comprise a communication resolution or a collision detection.

In accordance with an optional feature of the invention, the reference processor is arranged to measure and store the reference value during an initialization of the power transfer phase.

This may provide improved performance in many embodiments, and may in particular allow a more accurate or suitable reference value to be determined. In many embodiments, the initialization may comprise an entity detection process, and the determination of the reference value may be performed following the entity detection process and prior to the power transfer phase. The reference value may only be stored if the entity detection process indicates that no other entity than the one comprising the second communication unit is present.

In some embodiments wherein the reference value is determined during the initialization of the power transfer phase, the reference processor may be arranged to measure the reference value during a time interval in which the power transmitter generates a power transfer signal. This may allow the reference value to reflect the impact of the presence of a power transfer signal on the signal, and thus may more closely correspond to the measurement conditions during the power transfer phase.

Thus, in some embodiments, the apparatus may be arranged to measure and store the reference value prior to the power transfer phase.

In some embodiments, the reference processor may be arranged to measure and store the reference value during the power transfer phase.

In accordance with an optional feature of the invention, the apparatus further comprises a detector being a communication candidate detector arranged to detect a number of candidate communication units that can be communicated with by the first communication unit, and the reference processor is arranged to store the reference value only if the number of candidate communication units equals one.

This may provide improved reliability of operation in many embodiments, and may specifically in many scenarios increase the likelihood that the reference value reflects a scenario wherein only one power transmitter and one power receiver is present.

In accordance with an optional feature of the invention, the first communication unit is arranged to communicate with the second communication unit using short range communication, the short range communication having a range not exceeding 30 cm.

This may provide improved operation in many embodiments.

The system may combine the use of a short range inductive power transfer with a short range communication system while avoiding or mitigating interference between these, thereby allowing reliable operation to be achieved. The inventors have realized that using a separate communication link may introduce risks that the presence of more than one power receiver or power transmitter may result in undesired effects, and that these effects can be mitigated by using communication links with ranges comparable to the range of the inductive power transfer.

The approach may thus provide benefits by having very short ranges of both power transfer and communication while at the same time overcoming the disadvantages of both the power transfer and communication being short range.

The approach may specifically allow a more reliable operation and may reduce the risk of interference between the operations of multiple power transfer entities (receivers or transmitters) and power transfers which may be proximal to each other. The approach may also allow a substantially improved communication, including bidirectional communication, higher data rate communication and/or a more reliable communication.

The communication range may in some embodiments be measured in a given direction, and specifically in the direction of a plane in which a planar power transmitter coil is formed for radiating the power transfer signal.

In accordance with an optional feature of the invention, the short-range communication is a Near Field Communication.

This may allow particularly advantageous performance and characteristics.

The approach may reduce cost and provide a communication which is particularly suitable for power transfers as a sufficiently high data rate can be achieved while restricting the communication to very small ranges, typically ensuring that only one other communication entity may be present within the given range.

NFC is particularly suitable for the entity detection and indeed, the entity detection process may include NFC collision detection or resolution approaches.

In accordance with an optional feature of the invention, the power transfer signal has a periodically varying power, and the measurement unit is arranged to synchronize the determinations of the measured values to time intervals in which the power of the power transfer signal is below a threshold.

This may allow improved operation and specifically allow a more reliable detection of the potential of unintended entities being present. Specifically, it may in many embodiments reduce the impact of the power transfer signal on the measured values thereby allowing more accurate determination, and specifically a determination more closely corresponding to the determination of the reference value.

In accordance with an optional feature of the invention, the first communication unit is arranged to generate the communication signal and the characteristic reflects a loading of the communication signal.

This may provide particularly reliable operation and suitable parameters for detecting the potential presence of other entities. The approach may be particularly suitable for scenarios wherein the first communication unit generates the communication signal, such as scenarios wherein the first communication unit is an NFC initiator and the second communication unit is a passive NFC target.

In accordance with an optional feature of the invention, the communication signal is not generated by the first communication unit, and the reference value is indicative of a signal strength of the communication signal.

This may provide particularly reliable operation and suitable parameters for detecting the potential presence of other entities.

In accordance with an optional feature of the invention, the apparatus further comprises a power restrictor for restricting a power level of the power transfer signal in response to at least one of detecting the presence of the entity other than the second entity and detecting that the comparison indicates that the measured value and the reference value do not meet the similarity criterion.

This may allow improved operation of the power transfer system in many embodiments.

In accordance with an optional feature of the invention, the apparatus is the power transmitter and the second entity is the power receiver.

This may allow improved operation of the power transfer system in many embodiments.

In accordance with an optional feature of the invention, the apparatus is the power receiver and the second entity is the power transmitter.

This may allow improved operation of the power transfer system in many embodiments.

In accordance with an optional feature of the invention, the apparatus comprises a communication antenna for communicating with the second communication unit, and the measured values are indicative of at least one of a voltage, current and phase of an antenna signal of the communication antenna.

This may in many embodiments provide particularly advantageous parameters for detecting the potential presence of an unintended entity.

In accordance with an optional feature of the invention, the apparatus comprises a communication antenna for communicating with the second communication unit, and the measured values are indicative of at least one of an impedance and an inductance of the communication antenna.

This may in many embodiments provide particularly advantageous parameters for detecting the potential presence of an unintended entity.

In accordance with an optional feature of the invention, the apparatus comprises a communication antenna for communicating with the second communication unit and a front-end for coupling the first communication unit to the communication antenna; and the measured values are indicative of a property at an interface between the first communication unit and the front-end.

This may provide particularly advantageous parameters for detecting the potential presence of an unintended entity in many embodiments. The interface between the first communication unit and the front end may specifically be an interface between an integrated circuit (such as an NFC integrated circuit) and a circuit of discrete components coupling the integrated circuit to the communication antenna.

In accordance with an optional feature of the invention, the property is at least one of: an impedance of the front-end; at least one of a voltage, current and phase of a signal on a receive input of the first communication unit; and at least one of a voltage, current and phase of a signal on a transmit output of the first communication unit.

This may provide particularly advantageous parameters for detecting the potential presence of an unintended entity in many embodiments.

In accordance with an optional feature of the invention, the power transfer signal is provided in a power time interval of a repeating power transfer signal time frame, the power transfer signal time frame furthermore comprising a reduced power time interval; and wherein the first communication unit is arranged to synchronize the communication to the power transfer signal time frame such that short range communication is restricted to the reduced power time intervals.

This may allow improved communication and in particular may allow a substantially reduced impact of the power transfer signal on the communication signal thereby allowing reduced interference and thus a more reliable communication.

The invention may allow such improved communication while at the same time providing robustness, protection and/or mitigation against e g unintended operation caused by the presence of other potential communication candidates.

According to an aspect of the invention there is provided a method of operation for a wireless power transfer system including a power transmitter and a power receiver, the power transmitter being arranged to generate a wireless inductive power transfer signal for powering the power receiver during a power transfer phase, the method comprising: a first communication unit communicating with a second communication unit of a first entity using an electromagnetic communication signal, the first entity being one of the power receiver and the power transmitter; measuring and storing a reference value of a characteristic of the communication signal; repeatedly during the power transfer phase determining a measured value of the characteristic of the communication signal; comparing the measured values to the reference value; and triggering an entity detection process if the comparison indicates that a measured value and the reference value do not meet a similarity criterion, the entity detection process being arranged to detect a presence of an entity other than the first entity.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to a Qi power transfer system but it will be appreciated that the invention is not limited to this application but may be applied to many other power transfer systems.

Figure 1:
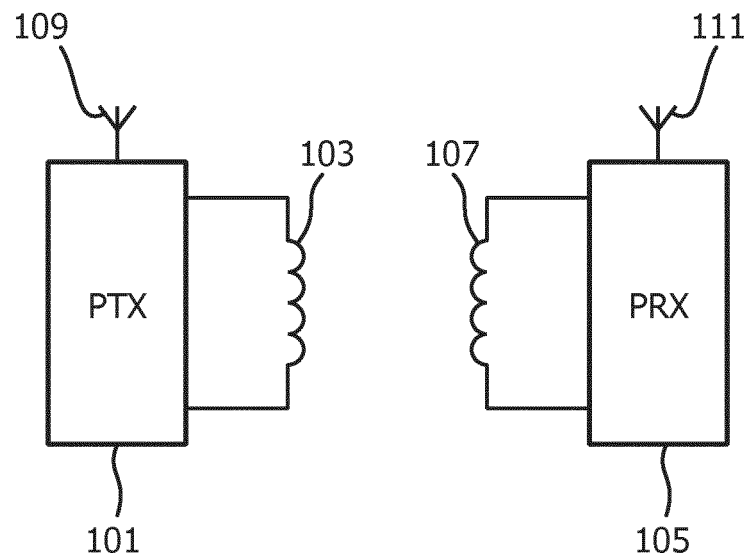
FIG. 1 illustrates an example of a power transfer system comprising a power transmitter and a power receiver in accordance with some embodiments of the invention.

FIG. 1 illustrates an example of a power transfer system in accordance with some embodiments of the invention. The power transfer system comprises a power transmitter 101 which includes (or is coupled to) a transmit power transfer coil/inductor which henceforth will be referred to as the transmitter coil 103. The system further comprises a power receiver 105 which includes (or is coupled to) a receive power transfer coil/inductor which henceforth will be referred to as the receiver coil 107.

The system provides a wireless inductive power transfer from the power transmitter 101 to the power receiver 105. Specifically, the power transmitter 101 generates a power transfer signal which is propagated as a magnetic flux by the transmitter coil 103. The power transfer signal may typically have a frequency between around 20 kHz to 200 kHz. The transmitter coil 103 and the receiver coil 107 are loosely coupled, and thus the receiver coil picks up (at least part of) the power transfer signal from the power transmitter 101. Thus, the power is transferred from the power transmitter 101 to the power receiver 105 via a wireless inductive coupling from the transmitter coil 103 to the receiver coil 107. The term power transfer signal is mainly used to refer to the inductive signal between the transmitter coil 103 and the receiver coil 107 (the magnetic flux signal), but it will be appreciated that by equivalence it may also be considered and used as a reference to the electrical signal provided to the transmitter coil 103, or indeed to the electrical signal of the receiver coil 107.

In some embodiments, the receive power transfer coil may even be a receive power transfer entity which when exposed to the inductive power transfer signal is heated up due to the induced eddy currents or additionally by hysteresis losses due to ferromagnetic behavior. For example, the receive coil 107 may be an iron plate for an appliance that is inductively heated. Thus, in some embodiments, the receive coil 107 may be an electrically conductive element which is heated by induced eddy currents or additionally by hysteresis losses due to ferromagnetic behavior. In such an example, the receive coil 107 thus also inherently forms the load.

In the following, the operation of the power transmitter 101 and the power receiver 105 will be described with specific reference to an embodiment in accordance with the Qi standard (except for the herein described (or consequential) modifications and enhancements). In particular, the power transmitter 101 and the power receiver 105 may substantially be compatible with the Qi Specification version 1.0 or 1.1 (except for the herein described (or consequential) modifications and enhancements).

To control the power transfer, the system may proceed via different phases, in particular a selection phase, a ping phase, an identification and configuration phase, and a power transfer phase. More information can be found in chapter 5 of part 1 of the Qi wireless power specification.

Initially, the power transmitter 101 is in the selection phase wherein it merely monitors for the potential presence of a power receiver. The power transmitter 101 may use a variety of methods for this purpose, e.g. as described in the Qi wireless power specification. If such a potential presence is detected, the power transmitter 101 enters the ping phase wherein a power transfer signal is temporarily generated. The signal is known as a ping signal. The power receiver 105 can apply the received signal to power up its electronics. After receiving the power transfer signal, the power receiver 105 communicates an initial packet to the power transmitter 101. Specifically, a signal strength packet indicating the degree of coupling between power transmitter and power receiver is transmitted. More information can be found in chapter 6.3.1 of part 1 of the Qi wireless power specification. Thus, in the Ping phase it is determined whether a power receiver 105 is present at the interface of the power transmitter 101.

Upon receiving the signal strength message, the power transmitter 101 moves into the Identification & Configuration phase. In this phase, the power receiver 105 keeps its output load disconnected and in conventional Qi systems a power receiver 105 in this phase communicates to the power transmitter 101 using load modulation. In such systems, the power transmitter provides a power transfer signal of constant amplitude, frequency and phase for this purpose (with the exception of the change caused by load-modulation). The messages are used by the power transmitter 101 to configure itself as requested by the power receiver 105. The messages from the power receiver 105 are not communicated continuously but are communicated in intervals.

Following the Identification and Configuration phase, the system moves on to the power transfer phase where the actual power transfer takes place. Specifically, after having communicated its power requirement, the power receiver 105 connects the output load and supplies it with the received power. The power receiver 105 monitors the output load and measures the control error between the actual value and the desired value of a certain operating point. It communicates such control errors to the power transmitter 101 at a minimum rate of e.g. every 250 ms to indicate these errors to the power transmitter 101 as well as the desire for a change, or no change, of the power transfer signal. Hence, in the power transfer phase, the power receiver 105 also communicates with the power transmitter.

The power transfer system of FIG. 1 thus utilizes communication between the power transmitter 101 and the power receiver 105.

In accordance with the Qi Specification version 1.0 and 1.1, a communication channel from the power receiver to the power transmitter can, as previously mentioned, be implemented using the power transfer signal as a carrier. The power receiver modulates the load of the receiver coil. This results in corresponding variations in the power transfer signal at the power transmitter side. The load modulation may be detected by a change in the amplitude and/or phase of the transmitter coil current, or alternatively or additional by a change in the voltage of the transmitter coil. Based on this principle, the power receiver can modulate data which the power transmitter demodulates. This data is formatted in bytes and packets. More information can be found in the "System description, Wireless Power Transfer, Volume I: Low Power, Part 1: Interface Definition, Version 1.0 July 2010, published by the Wireless Power Consortium" available via http://www.wirelesspowerconsortium.com/downloads/wireless-power-specification-part-1.html, also called the Qi wireless power specification, in particular chapter 6: Communications Interface.

It is noted that the Qi wireless power specification versions 1.0 and 1.1 define only communication from the power receiver to the power transmitter, i.e. it defines only a unidirectional communication.

The system of FIG. 1 uses a different approach to communication than that disclosed in the Qi wireless power specification versions 1.0 and 1.1. However, it will be appreciated that this different approach to communication may be used together with other communication approaches, including the communication approach of the Qi wireless power specification versions 1.0 and 1.1. For example, for a Qi type system, the communication approach of Qi wireless power specification versions 1.0 and 1.1 may be used for all communication that is specified to be performed by the Qi wireless power specification versions 1.0 and 1.1, but with additional communication being supported by the different approach described in the following. Also, it will be appreciated that the system may communicate in accordance with the Qi wireless power specification versions 1.0 and 1.1 in some time intervals but not in others. For example, it may use standard load modulation during the Identification and Configuration phase where the power transfer signal and external loads are constant but not during the power transfer phase where this is not the case.

In the system of FIG. 1, communication between the power receiver 105 and power transmitter 101 is enhanced with respect to the standardized communication of Qi wireless power specification versions 1.0 and 1.1.

Firstly, the system supports communication of messages from the power transmitter 101 to the power receiver 105, and in particular allows the power transmitter 101 to transmit data to the power receiver 105.

Specifically, a communication link from the power transmitter 101 to the power receiver 105 may be established using a dedicated communication link (henceforth referred to as the forward communication link). The forward communication link is independent of the power transfer signal and specifically does not use the power transfer signal as a carrier to be modulated by the power transmitter 101. The forward communication link is not communicated via the transmitter coil 103 or the receiver coil 107 but uses separate communication antennas (e.g. implemented as coils). In some embodiments, the forward communication link may be implemented by (antenna) coils coupling as a loose transformer or may in other embodiments use antennas that are not closely coupled.

Another difference of the system of FIG. 1 to a conventional Qi system is that rather than exclusively using load modulation for communications from the power receiver 105 to the power transmitter 101, the systems makes use of a separate communication link (henceforth referred to as the reverse communication link) which does not use the power transfer signal, and specifically does not use either of the transmitter coil 103 or the receiver coil 107 for communication but rather uses separate communication antennas (e.g. implemented as coils). In some embodiments, the reverse communication link communication link may be implemented by (antenna) coils coupling as a loose transformer or may in other embodiments use antennas that are not closely coupled.

In particular, the power transmitter 101 includes a first communication antenna 109 and the power receiver 105 comprises a second communication antenna 111 which are used for establishing RF communication links that do not use the power transfer signal, the power transmitter coil 103 or the power receive coil 107.

The forward communication link thus provides a link from the power transmitter 101 to the power receiver 105, and the reverse communication link thus provides a link from the power receiver 105 to the power transmitter 101. The links use a communication approach that does not rely or use the transmit coil 103, the receive coil 107, or indeed the power transfer signal. Rather, in most embodiments, the forward and reverse communication links are completely independent of the power transfer signal and may not be affected by any dynamic changes in the characteristics of this. In particular, the forward communication link and reverse communication link are substantially decoupled from load variations of the power receiver 105. Accordingly, the forward and reverse communication links may provide improved communication between the power transmitter 101 and the power receiver 105, and may in particular provide a more reliable communication in situations where the load of the power receiver 105 is a variable load.

Indeed, in order to prevent interference to the communication from changes in the power transfer signal, a communication link may be used which is physically uncoupled as much as possible from the power channel. For example, an RF signal with a frequency that is much higher than that of the power signal together with antennas designed specifically for this high frequency will provide sufficient decoupling between the power signal and the forward and reverse communication links. Further advantages of a separate communication link (and specifically of using a higher carrier frequency) include that the communication channel can support a higher data rate and can carry more redundant information which can be used to increase the reliability (e.g. by using error correcting coding).

However, the use of a communication link that is independent of the power transfer signal may also have some disadvantages. In particular, communication by load modulation of the power signal inherently tends to ensure that the data communicated is between the correct power receiver 105 and power transmitter 101, i.e. the power transmitter 101 can reliably assume that the received data can be used to control the power transfer operation. However, the Inventors have realized that when a separate reverse communication link independent of the power transfer signal is used, there is a risk that the data transmitted from the power receiver 105 may not be received by the power transmitter 101 that delivers power to the power receiver 105. Also, there is a risk that the data may be received by a different power transmitter, one that does not deliver power to the power receiver 105. Similarly, there is a risk that data received by the power transmitter 101 may not have originated from the expected power receiver 105 but may e.g. originate from another power receiver.

In the same way there is a risk that data transmitted on the forward communication link may be received by other power receivers or that the data which is received by the power receiver 105 is from a different power transmitter 101.

The issue may be particularly significant for situations where a plurality of power transmitters is positioned within a limited area and may simultaneously transfer power to a plurality of power receivers may take place.

The issue may also be particularly significant for power transmitters that include a plurality of transmit coils and which are capable of simultaneously supporting a plurality of power transfers.

For example, the use of a separate RF communication link for the reverse communication link typically does not require that the power receiver 105 is positioned correctly for the communication to be carried out as would be the case for load modulation of the power transfer signal. Specifically, the fact that successful communication is possible using the separate reverse communication link will typically not guarantee that the receive coil 107 is positioned sufficiently close to the transmit coil 103. If a power receiver controls a power transmitter via such communication channel, the system can therefore not be certain that the receive coil is positioned sufficiently close to the transmit coil (and thus the coupling between the receive coil and the transmit coil may be very low). It is possible that the power receiver keeps requesting the power transmitter to power up until the provided power is sufficiently high for the power receiver to receive sufficient power even with the current inefficient coupling. However, this may require a very strong magnetic field to be induced and this could lead to unexpected and undesirable exposure of the user or metal objects to the magnetic field generated by the power transmitter.

The power transmitter and power receiver may include additional functionality for verifying and checking the position of the power receiver but such additional functionality will typically add complexity and cost.

As another example, the simultaneous use of multiple appliances with individual power receivers could lead to the situation where a first power receiver coupled to a first power transmitter interferes with a second power receiver coupled to a second power transmitter. The control data from the first power receiver could be picked up by the second power transmitter, and vice versa. As a result, the second power transmitter could be controlled by control data received from the first power receiver while providing power to the second power receiver (and similarly for the first power transmitter). This could result in the second power transmitter being controlled to generate a high magnetic field that is not appropriate for the second power receiver. For example, if the first power receiver detects that the level of the power signal should be increased, it may request a power up. However, this request could be received by the second power transmitter rather than the first power transmitter and it will then result in the second power transmitter increasing the power of the power transmitter despite the second power receiver not requiring higher power. Indeed, the first power receiver will still detect that the level of the power signal is too low (as it has not been changed) and it will continue to request a power up. Thus, the second power transmitter will continue to increase the power level. This continuous power up could lead to damage, excessive heat generation, and in general to an undesirable and even potentially unsafe situation for the second power receiver and the associated appliance.

As a specific exemplary scenario to illustrate the issue, a user may put a wirelessly powered kettle on top of a first power transmitter. The first power transmitter may detect that an object is placed on its power transfer interface and it may provide a power transfer signal with low power to the kettle in order start up its electronics. The kettle then sends information via the RF reverse communication link to the power transmitter in order to initiate and control the power transmitter to provide power. After some time, the user may decide to put a wirelessly powered pan on the first power transmitter and accordingly he may move the kettle to a second power transmitter near the first power transmitter. The second power transmitter detects the kettle and will under control of the kettle transfer power to the kettle. The first power transmitter may detect the pan, but will still receive the control data from the kettle. The first power transmitter will therefore provide power to the pan but the power signal will be controlled by the kettle. This can result in an unexpected heating of the pan and in the loss of ability of the pan to control the power transfer. The user will typically not be aware of the situation and may e.g. touch the pan which may be inappropriately hot.

Figure 2:
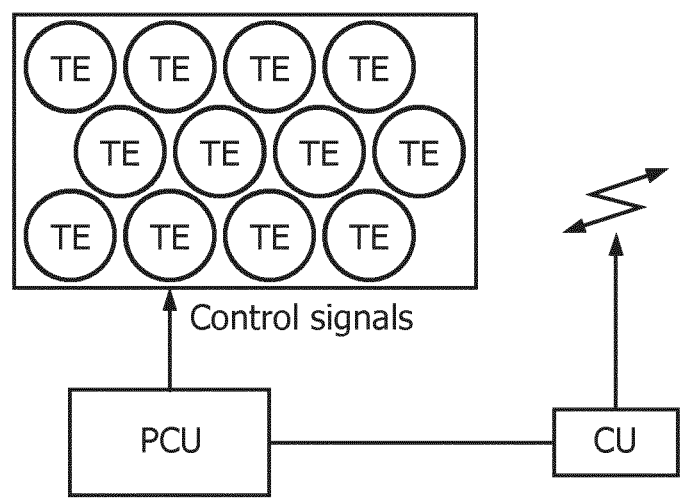
FIG. 2 illustrates an example of elements of a power transmitter in accordance with some embodiments of the invention.

The issue may be particularly relevant to scenarios where a plurality of power transmitters is positioned within a small area with simultaneously power transfer to a plurality of power receivers being possible. Furthermore, it may be particularly relevant to scenarios where a power transmitter comprises a plurality of transmit coils. For example, as illustrated in FIG. 2, a power transmitter may comprise a power controller PCU which controls a plurality of transmit elements TE each comprising a transmit coil. At the same time, a separate communication unit CU may receive data from a separate RF reverse communication link. In such a scenario, a first power receiver may be positioned on a first of the transmit elements/coils TE. For example, a first appliance may be positioned on the transmit coil array, and a power transfer to the first appliance may start. The first appliance may transmit control data back to the power transmitter using the RF reverse communication link, and the power signal of the first transmit coil TE may be arranged in accordance. The user may now desire to charge a second appliance. He may move the first appliance slightly to one side in order to make room for the second appliance which may result in the first appliance now being positioned over a different transmit coil, such as e.g. over a neighboring transmit coil. However, this may not be detected by the system and indeed the reverse communication link from the first appliance will still work. The first appliance will request to increase the power to compensate for the low coupling resulting in a very large magnetic field potentially being generated by the first transmit coil. Indeed, in many scenarios, the second appliance could potentially be positioned on top of the first transmit coil and it would consequently experience the high magnetic field without any chance of reducing it. Thus, the control of the power transfer may effectively be lost, and indeed in some scenarios the power transfer for one mobile may be controlled by the other and vice versa.

The system of FIG. 1 may comprise functionality which can address and reduce the risk of such scenarios occurring. Specifically, the system may detect if more than one potential communication candidate is available for either the power transmitter 101 (or possibly the power receiver 105). If so, there is a potential risk of the communication link being with a different entity than expected, and specifically there is a potential risk that the power transmitter 101 may communicate with a power receiver that is not the one being powered by the power transmitter 101. The system uses a specific approach for detecting such potentially risky situations with the approach being particularly suitable for the power transfer.

Figure 3:
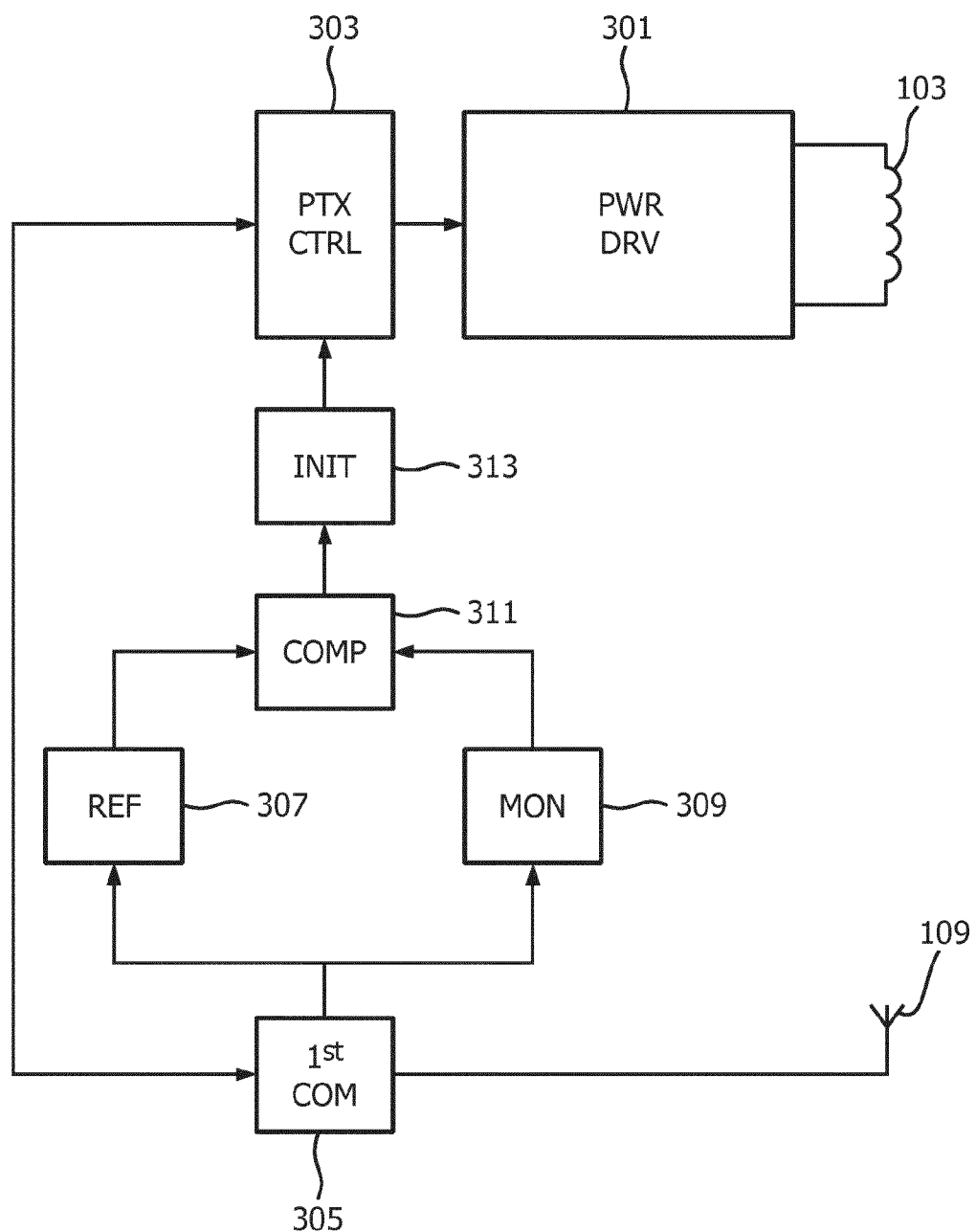
FIG. 3 illustrates an example of elements of a power transmitter in accordance with some embodiments of the invention.

The approach will first be described for a scenario wherein the functionality is implemented in a power transmitter 101. FIG. 3 illustrates elements of the power transmitter 101 of FIG. 1 in more detail for such a scenario.

The power transmitter 101 comprises the transmit coil 103 which is coupled to a driver 301 that is arranged to generate the drive signal of the transmit coil 103, and thus is arranged to generate the drive signal which is translated into the inductive power transfer signal. The driver 301 is arranged to generate an AC signal with a desired power level which is fed to the transmit coil 103 to generate the power transfer signal. It will be appreciated that the driver 301 may comprise suitable functionality for generating the drive signal as will be well known to the person skilled in the art. For example, the driver 301 may comprise an inverter for converting a DC power supply signal into an AC signal of a suitable frequency (typically around 20-200 kHz) for the power transfer. It will also be appreciated that the driver 301 may comprise suitable control functionality for operating the different phases of the power transfer system. In many cases, the driver 301 will contain one or more capacitors in order to realize a resonance circuit with the power coil 103 for a chosen frequency.

The driver 301 is coupled to a power transmitter controller 303 which is arranged to control various operational aspects of the power transmitter. Specifically, the power transmitter controller 303 may initiate various operational procedures and control in which mode of operation the power transmitter 101 operates. For example, the power transmitter controller 303 may control the power transmitter 101 to terminate a power transfer phase, to operate with reduced power during a power transfer phase, to initiate collision detection or foreign object detection etc.

The power transmitter 101 furthermore comprises a first communication unit 305 which is arranged to communicate with the power receiver 105. Specifically, the first communication unit 305 can communicate data to the power receiver 105 on a forward communication link and receive data from the power receiver 105 on a reverse communication link. The communication links are short range RF communication links and accordingly the power transmitter 101 comprises a communication antenna 109 coupled to the first communication unit 305.

The system may support communication of messages from the power transmitter 101 to the power receiver 105, and in particular allows the power transmitter 101 to transmit data to the power receiver 105. Also, the communication from the power receiver 105 to the power transmitter 101 may use the RF communication link to provide an enhanced communication that is not limited by the low data rate of communication by load modulation.

In particular, the system of FIG. 1 utilizes a second communication link which is independent of the power transfer signal in the sense that it does not involve any modulation of the power transfer signal or use the power transfer signal as a carrier.

The communication link is a short range communication link with a range of no more than 30 cm. Thus, communication is only guaranteed up to a distance of 30 cm. In some embodiments, the range is no more than 20 or even 10 cm. Indeed, in many embodiments, typical communication ranges may be in the neighborhood of a few centimeters.

Although the communication link is intended to be completely independent from the power link, the power signal will in practice tend to interfere with the communication link/signal due the closeness and high signal strength. Especially if planar coils are used for the communication link, voltages will tend to be induced in the communication coils due to the coupling of the communication coils to the power coils. To mitigate this interference, the communication may take place in time-intervals in which the power signal level is reduced or the power signal is switched off as will be described in more detail later.

The communication range may be the maximum distance between the antennas which allow reliable communication. Reliable communication may be considered to require an error rate to be below a threshold, such as e.g. a (channel or information) bit error rate of less than $10^{-3}$.

In the specific example, the first communication unit 305 is an NFC communication unit and thus the communication links are NFC communication links. The antenna 109 may specifically be an NFC planar coil.

The first communication unit 305 may thus exchange data messages with the power receiver 105 using short range communication, and specifically using NFC communication. The range of the communication is limited to no more than 30 cm and in many embodiments to no more than 20 or 10 cm. Typical communication links may be over distances of only a few cm.

The use of a short range communication link such as NFC ensures that although a separate communication link independent of the power transfer signal is used, there is a guaranteed geometric relationship between the power transmitter 101 and the power receiver 105, and specifically it can be ensured that the power transmitter 101 and the power receiver 105 are relatively close to each other.

The first communication unit 305 may transmit data messages to the power receiver 105 over the NFC communication link or may receive data messages from the power receiver 105 over the NFC communication link. Specifically, the first communication unit 305 may transmit a forward message to the power receiver 105 over the NFC communication link with the power receiver 105 being expected to respond by transmitting a response message back to the power transmitter 101 over the NFC communication link. The response message may e.g. be used to confirm that the reverse communication link is indeed a link with the power receiver 105 that is taking part in the power transfer.

In some embodiments, only one of the forward and reverse communication links may be established by the short range (NFC) communication. For example, in some embodiments, the communication link to the power receiver 105 may be established using modulation of the power transfer signal whereas the reverse communication link is established using NFC communication. As another example, in some embodiments, the communication link to the power transmitter 101 may be established using load modulation of the power transfer signal whereas the forward communication link is established using NFC communication. In such embodiments, an NFC bidirectional communication may still be established (to comply with NFC requirements) but power transfer related data may be communicated only in one direction.

The first communication unit 305 is accordingly arranged to communicate with a second communication unit in the power receiver 105, i.e. in the specific example the second communication unit is a short range communication unit, and specifically is an NFC communication unit, that can communicate with the first communication unit 305.

The communication is performed using a communication signal that specifically may be an RF electromagnetic signal. The communication signal is in many embodiments a modulated carrier signal which is transmitted from a transmit antenna to a receive antenna. In the example, the communication signal is a carrier signal transmitted or received by the antenna 109. The communication signal may specifically be a modulated carrier signal where the modulation may for example be an amplitude, phase, frequency or load modulation.

The power transmitter 101 further comprises a reference processor 307 which is arranged to measure and store a reference value for a characteristic of the communication signal. For a communication signal transmitted by the antenna 109, the characteristic may specifically be a loading of the communication signal, and thus the reference value may be a value indicative of (dependent on) a loading of the communication signal. For a communication signal received by the antenna 109, the characteristic may specifically be a signal strength of the communication signal, and thus the reference value may be a value indicative of (dependent on) the signal strength of the communication signal.

The reference processor 307 may specifically be arranged to measure the reference value at a given time when it is considered highly likely that there are no other entities than the power receiver 105 which affects the characteristic of the communication signal. For example, the signal strength may be measured at a time when it is known (or highly likely) that only the second communication unit is generating an RF signal, or the loading may be measured when it is known (or highly likely) that the only load of the RF signal is by the second communication unit. The measurements may for example be made immediately following or as part of a detection process which seeks to detect the presence of other entities than the power receiver 105. For example, the measurement may be made immediately following an NFC collision resolution/detection.

The reference processor 307 thus measures and stores a reference value for the communication signal which is considered/assumed to reflect the situation when there are no other entities present in the vicinity of the antenna 109. The antenna 109 may typically be substantially co-located with the transmit coil 103 (say within 5 cm) and thus the reference value reflects a scenario wherein there are no other entities present proximal to the transmit coil 103, such as typically within a distance corresponding to the communication range of the communication signal (e.g. within, say, 10 cm or more). Specifically, the reference value may thus reflect the characteristic of the communication signal at a time when there are no other complementary communication units present (within the communication range) than the second communication unit and/or no foreign objects present.

The power transmitter 101 further comprises a monitor 309 arranged to repeatedly determine a measured value for the characteristic of the communication signal when the power transmitter is in the power transfer phase.

The same characteristic for which the reference value is stored may thus be evaluated repeatedly during the power transfer phase. The frequency of the generation of a new measured value may depend on the preferences and requirements of the individual embodiment. The values may for example be generated regularly and periodically or may e.g. be generated in response to specific actions or events. In many embodiments, the duration between subsequent values being generated does not exceed 1 second, or in many scenarios more advantageously does not exceed 500 msecs or 250 msecs.

It will be appreciated that the measured values and the reference value may be determined by direct or indirect measurements. Thus, in some embodiments, the values may represent a property which is measured directly, and specifically the values may simply be the measurement results. In other embodiments, measurement results may be processed to generate the reference value or the measured values. For example, power measurements may be generated from measurements of voltages and currents, signal strength values may be calculated from measured low frequency voltages (e.g. from peak or amplitude detectors), compensation values or other measurements may be included in the generation of the reference or measurement values etc. It will also be appreciated that the values may not directly be values of the characteristic but may be values that depend on the characteristic. Thus, the values may be indicative of the value of the characteristic. For example, the loading of the communication signal may be reflected by a measurement of a current drain by the antenna 109, the impedance of a front-end for the antenna 109 or a current/voltage phase offset of the antenna 109. As another example, the signal strength of a received communication signal may be reflected by a voltage over a capacitor of a peak detector etc. Thus, the reference values and measured values may be values of any property that is indicative of a value of the characteristic of the communication signal.

The power transmitter 101 further comprises a comparator 311 which is coupled to the reference processor 307 and the monitor 309. During the power transfer phase, the comparator 311 receives the reference value and the measured values. For each of the measured values, the comparator 311 proceeds to compare the reference value to the measured value and to evaluate whether these meet a similarity criterion.

The similarity criterion is met if the reference value and the measured value are sufficiently similar in accordance with a given measurement comparison. The criterion may be different in different embodiments. In many embodiments, the similarity criterion is met if the (absolute) difference between the measured value and the reference value is below a given threshold. The threshold may be a predetermined threshold, or may be a dynamically varying threshold, e.g. dependent on other properties or characteristics.

The results of the comparison of the measured values to the reference value are fed to an initiator 313 which is coupled to the comparator 311. Specifically, the initiator 313 may be fed a signal indicating whether the individual comparison between a measured value and the reference value meets the similarly criterion or not.

The initiator 313 is coupled to the power transmitter controller 303 and may initiate/trigger the power transmitter controller 303 to perform specific operations. In particular, the initiator 313 may, dependent on the result of the comparison by the comparator 311, decide whether to initiate an entity detection process or not. The entity detection process is arranged to detect whether other entities, such as foreign objects or other power receivers (comprising short range communication units), than the power receiver 105/a device comprising the power receiver 105 are present within a given range of the detection process.

The initiator 313 is specifically arranged to trigger the entity detection process in response to a detection that the comparison shows that a measured value and the reference value does not meet the similarity criterion. For example, if the currently measured value exceeds the reference value by more than a given amount, this can be detected by the comparator 311 and in response the initiator 313 can trigger the power transmitter controller 303 to perform an entity detection.

The measured value failing to meet the similarity criterion with respect to the stored reference value may be an indication that a change has occurred in the electromagnetic environment. This change may be due to the presence of another entity which was not present during the measurement of the reference value. Thus, the comparison may indicate that a new entity has entered the local environment.

For example, if the communication signal is generated by the power transmitter 101 and the reference and measured values are indicative of a loading of the communication signal, a change in the loading may be caused by the presence of a foreign object (such as metal in which eddy currents are induced) or the presence of another communication unit (such as a passive NFC receiver powered by the communication signal). This could result in undesirable scenarios (e.g. overheating of the foreign object by heat resulting from induced currents caused by the power transfer signal, or by the power transfer control data exchange being with a different power receiver than the power receiver involved in the power transfer). The power transmitter 101 of FIG. 3 may accordingly proceed to perform an entity detection to determine whether such a potential entity is present. If so, it may e.g. terminate the power transfer to avoid that undesirable power transfer scenarios occur. Thus, a safer and more reliable operation can be achieved.

Similarly, in cases where the communication signal is not generated by the first communication unit 305, but by the power receiver 105, the received signal level may be monitored. The reference value indicates the signal level at a time where it is assumed that there are no other communication units present than the one of the intended power receiver 105. Thus, the reference value corresponds to the received signal level of the signal generated by the power receiver 105. However, if during power transfer, it is detected that the measured received signal level increases substantially, this may be due to the introduction of a new communication unit transmitting a signal. For example, an NFC communication unit of another power receiver may also generate an NFC communication signal. This could result in a conflict between the two power receivers and could result in the power transmitter 101 communicating with the wrong power receiver. Therefore, the initiator 313 may terminate power transfer and initiate a detection process determining how many compatible communication units are present. Thus, again, undesired and potentially risky scenarios may be avoided.

A particular advantage of the approach is that the check can be performed continuously during power transfer and it is thus particularly suitable for detection of changes in the current situation, such as e.g. when a user moves devices comprising power receivers.

It will be appreciated that the similarity criterion in addition to the current measured value and reference value may also be dependent on other factors and properties, including being dependent on other measured values and how they e.g. relate to the reference value. For example, the similarity criterion may require that no two consecutive measured values differ from the reference value by more than a given amount. If the current measured value differs by more than this amount, the similarity criterion may still be considered met if the previous measured value differed by less than the amount but not if the previous measured value differed by more than the amount.

Figure 4:
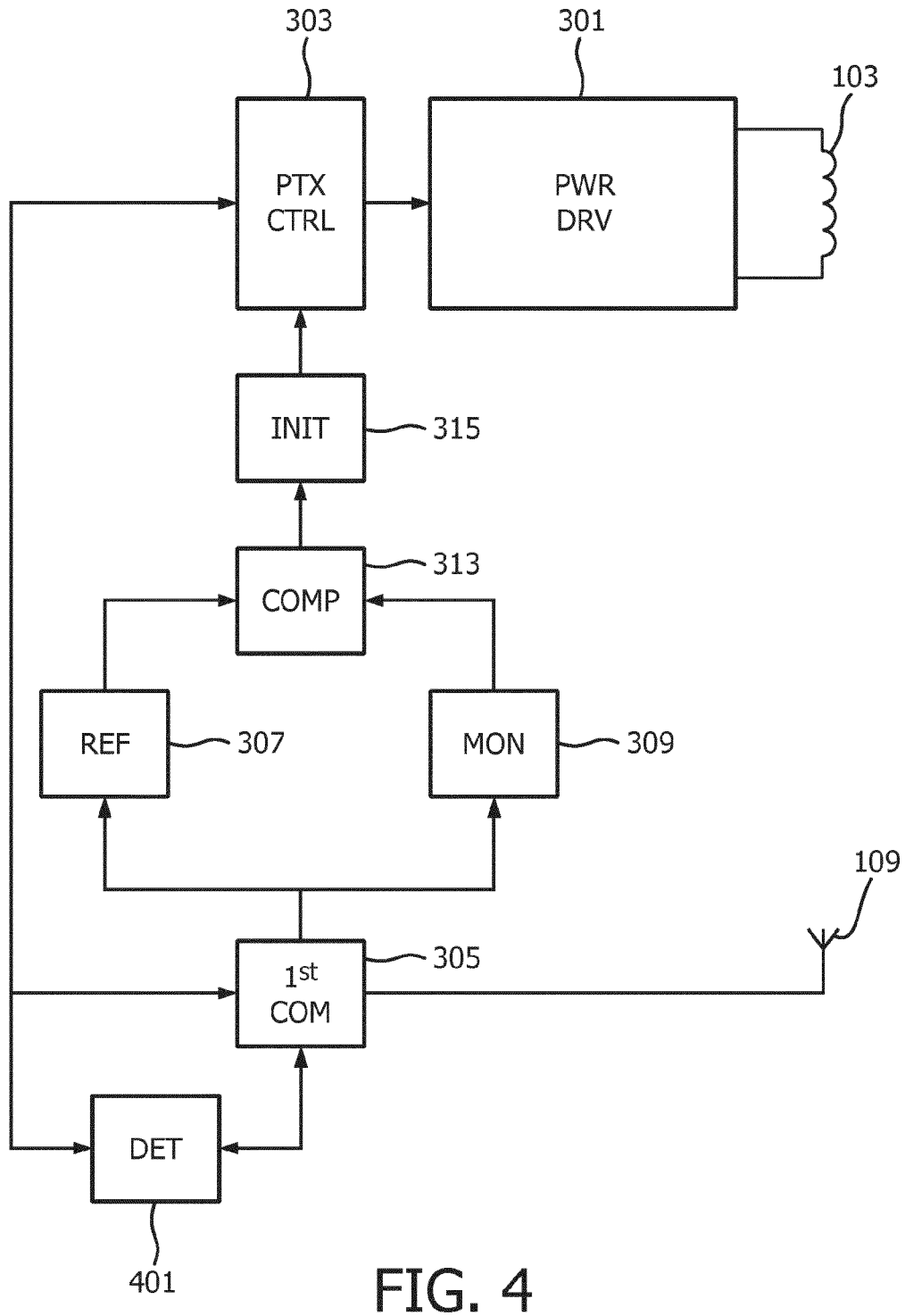
FIG. 4 illustrates an example of elements of a power transmitter in accordance with some embodiments of the invention.

As previously mentioned, the entity detection process may specifically be a detection process that seeks to identify how many potential communication candidates there are for the first communication unit 305. Thus, as illustrated in FIG. 4, the power transmitter 101 may comprise a detector 401 which is arranged to perform the entity detection process by detecting whether (at least) a third communication unit is present. The detection process may thus detect if any other communication candidates are present. If so, it is possible that the first communication unit 305 could receive or transmit data from or to the wrong power receiver and accordingly the power transmitter 101 may take account to avoid this during power transfer, e.g. by terminating the power transfer.

The entity detection process may specifically for an NFC implementation comprise an NFC collision detection or resolution.

Indeed, NFC comprises functionality for detecting the number of other NFC devices that a given NFC communication unit may be capable of communicating with, i.e. for determining the number of potential other NFC communication units within the communication range.

The exact approach used may depend on the specific variant of NFC used and whether the first communication unit 305 is acting as an initiator or a target. In NFC terminology, an initiator is the communication unit which initiates the setup of a new NFC communication link and a target is a communication unit which responds to this initiation. The roles of initiator and target are maintained for the duration of the communication but may vary for different communication links. Specifically, many NFC communication units are capable of operating both as initiator and target.

The specific collision detection may also depend on whether the communication is operated in active mode wherein the NFC communication unit that is currently transmitting data also generates the carrier signal (in this mode both NFC communication units use amplitude modulation of a locally generated carrier signal) or in passive mode wherein only the initiator generates a carrier signal which may be amplitude modulated when the initiator is transmitting data and load modulated when the target is transmitting data.

The collision resolution activity and RF collision avoidance may be performed in accordance with the NFC standard (ref. e.g. ISO/IEC_18092: Information technology—Telecommunications and information exchange between systems—Near Field Communication—Interface and Protocol (NFCIP-1), Second edition, 15 Mar. 2013).

Specifically, in passive mode, the entity detection process may be performed as a collision resolution activity. Once this activity is performed according to the NFC standard, the initiator has knowledge of the number of targets it can communicate with. However, after having performed the collision resolution activity, the initiator is only able to detect targets which communicate using the same NFC technology (i.e. NFC-A, NFC-B or NFC-F) as the initiator. Thus, a fast detection process to detect whether any new objects/NFC targets are present will improve the safety of the system.

Specifically, in active mode, an initiator is able to communicate with only one target. In this case, the initiator and/or the target may perform the RF collision avoidance according to the NFC standard as the entity detection process. The RF collision avoidance is a process where the initiator (or the target) checks if another RF field is being generated. It shall not generate its own RF field as long as another RF field is detected. Thus, the RF field of a second power receiver (or second power transmitter) containing an active NFC device, and which is not being part of the power transfer between a first power transmitter and a first power receiver, can be detected. This process however does not detect passive NFC devices. Thus, a fast detection process to detect whether any new objects/passive NFC devices are present will improve the safety of the system. The RF collision avoidance technique is also applicable to the passive mode NFC devices.

In this way, the detector 401 may thus detect whether other communication units that are potential communication candidates for the first communication unit 305 are present or not. Specifically, it may be detected whether other NFC communication units are present with which the first communication unit 305 may potentially communicate. If so, there is a risk that the power transmitter 101 could transmit data that would be received by this other communication unit, and this could result in potential erroneous operation. Similarly, there is a risk that data transmitted from this other communication unit could be received by the first communication unit 305 and could be thought to originate from the second communication unit, i.e. from the power receiver 105. Thus, the operation of the power transfer could be distorted by the presence of another communication unit. For example, power control error messages from another power receiver could be thought to be from the power receiver 105 being powered, and thus could result in wrong power levels being set for the power transfer signal.

Accordingly, if the detector 401 detects the presence of another communication unit than the second communication unit (i.e. that of the power receiver 105), then it may indicate this to the power transmitter controller 303. In response, the power transmitter controller 303 may proceed to inhibit the power transfer operation. Specifically, the power transmitter controller 303 may reduce the power level to a level that is inherently considered safe. For example, the power transfer signal may be set to a fixed power value which is considered to be sufficient for many power transfer operations, yet sufficiently low that it is considered impossible to result in overheating etc. As another example, the power transmitter controller 303 may in response to the detection of another communication unit proceed to terminate the power transfer completely.

The power transmitter controller 303 may furthermore generate a user alert which may alert the user thereby allowing the user to remedy the situation, e.g. by removing a close device comprising a power receiver.

It will be appreciated that in some embodiments, the power transmitter 101 may proceed to restrict the power level of the power transfer signal (e.g. by limiting the maximum power or by terminating the power transfer/exiting the power transfer phase) when another entity (e.g. another communication unit) is detected, i.e. following the entity detection. However, in some embodiments, the restriction of power may be performed prior to the entity detection process, and may specifically be performed already when the comparator 311 detects that the similarity criterion is not met. Dependent on outcome of the entity detection process, the power transmitter 101 may then decide whether or not to enter the power transfer phase again.

In some embodiments, the entity detection may alternatively or additionally include a foreign object detection. Indeed, in many scenarios the presence of an object which may not be (or comprise) a communication unit may still affect the communication signal. For example, if a conductive element, such as a metallic ring or key, is placed close to a communication antenna (and specifically a communication coil as is typically used for e.g. NFC communication), the communication signal may induce currents in the element. This may result in the loading of the generated communication signal changing with respect to the scenario where no such object is present. The reference value represents the scenario where no other objects are present, and the detection of a change in the measured values relative to the reference signal may be caused by a foreign object being positioned close to the power transmitter.

Accordingly, in some embodiments, a determination that the reference value and the measured value do not meet the similarity criterion may cause the initiator 315 to initialize an entity detection which is (or includes) a foreign object detection. The foreign object detection may specifically be a parasitic power loss detection (e.g. detecting whether the power extracted from the power transfer signal exceeds the estimated power consumption of the power receiver by more than a given level).

Specifically, the power transmitter 101 may estimate the parasitic power loss (i.e. the difference between the power provided to the power signal by the power transmitter 101 and that consumed by the power receiver 105). If this exceeds a given level, it is considered likely to be due to a foreign object being present and accordingly the power transmitter 101 may proceed to terminate power transfer.

In the Qi power transfer standard, the power receiver estimates its received power e.g. by measuring the rectified voltage and current, multiplying them and adding an estimate of the internal power losses in the power receiver (e.g. losses of the rectifier, the receive coil, metal parts being part of the receiver etc.). The power receiver reports the determined received power to the power transmitter with a minimum rate of e.g. every four seconds.

The power transmitter estimates its transmitted power, e.g. by measuring the DC input voltage and current of the inverter, multiplying them, and correcting the result by subtracting an estimation of the internal power losses in the transmitter, such as e.g. the estimated power loss in the inverter, the primary coil and metal parts that are part of the power transmitter.

The power transmitter 101 can estimate the power loss by subtracting the reported received power from the transmitted power. If the resulting parasitic power loss estimate exceeds a detection threshold, the power transmitter 101 will assume that too much power is dissipated in a foreign object, and it can then proceed to terminate the power transfer.

Specifically, the power transfer is terminated when the parasitic power loss estimate PT−PR is larger than a threshold where PT is the transmit power estimate and PR is the receive power estimate.

The measurements may be synchronized between the power receiver and the power transmitter. In order to achieve this, the power receiver can communicate the parameters of a time-window to the power transmitter during configuration. This time window indicates the period in which the power receiver determines the average of the received power. The time window is defined relative to a reference time, which is the time when the first bit of a received power packet is communicated from power receiver to power transmitter. The configuration parameters for this time window consist of a duration of the window and a start time relative to the reference time.

When performing foreign object detection using this power loss detection, it is important that the power loss is determined with sufficient accuracy to ensure that the presence of a foreign object is detected.

Firstly, it must be ensured that a foreign object that absorbs significant power from the magnetic field is detected. In order to ensure this, any error in estimating the power loss calculated from the transmitted and received power must be less than the acceptable level for power absorption in a foreign object. Similarly, in order to avoid false detections, the accuracy of the power loss calculation must be sufficiently accurate not to result in estimated power loss values that are too high when no foreign object is present.

It is substantially more difficult to determine the transmitted and received power estimates sufficiently accurately at higher power levels than for lower power levels. For example, assuming that an uncertainty of the estimates of the transmitted and received power is ±3%, this can lead to an error of ±150 mW at 5 W transmitted and received power, and
±1.5 W at 50 W transmitted and received power.

Thus, whereas such accuracy may be acceptable for a low power transfer operation it is not acceptable for a high power transfer operation.

Typically, it is required that the power transmitter must be able to detect power consumption of foreign objects of only 350 mW or even lower. This requires very accurate estimation of the received power and the transmitted power. This is particularly difficult at high power levels, and frequently it is difficult for power receivers to generate estimates that are sufficiently accurate. However, if the power receiver overestimates the received power, this can result in power consumption by foreign objects not being detected. Conversely, if the power receiver underestimates the received power, this may lead to false detections where the power transmitter terminates the power transfer despite no foreign objects being present.

In the system of FIG. 1, the accuracy may be improved by the foreign object detection performed by the power transmitter 101 being performed using specific test conditions. For example, in response to the detection the current measured value differs from the reference value by more than a given threshold, the power transmitter 101 before starting the entity detection proceed to terminate the power transfer. It may then instruct the power receiver 105 to disconnect the load (if possible) and set a given (safe) level of the power signal. In some embodiments, this may reduce the power drawn by the power receiver 105 to negligible levels and the power transmitter 101 may simply measure the power drawn and compare it to a threshold. If the power drawn exceeds the threshold, this is likely to be due to the presence of a foreign object and the power transmitter 101 may proceed accordingly, e.g. by generating a user alert. As the detection can be performed at low power (and thus for longer durations) and with the load disconnected, a more accurate parasitic power loss/foreign object detection can be performed.

In some embodiments, the power drawn due to the presence of the power receiver 105 may not be negligible. However, in many such embodiments, it may be possible to estimate the power drawn during test conditions to a sufficient accuracy, e.g. based on prior knowledge or a calibration performed when no foreign objects are present (e.g. as confirmed by a user input). The analysis of the power drawn may then be compensated for the power which is drawn by the power receiver 105, e.g. by reducing the measured power drain or by increasing the detection threshold.

Figure 5:
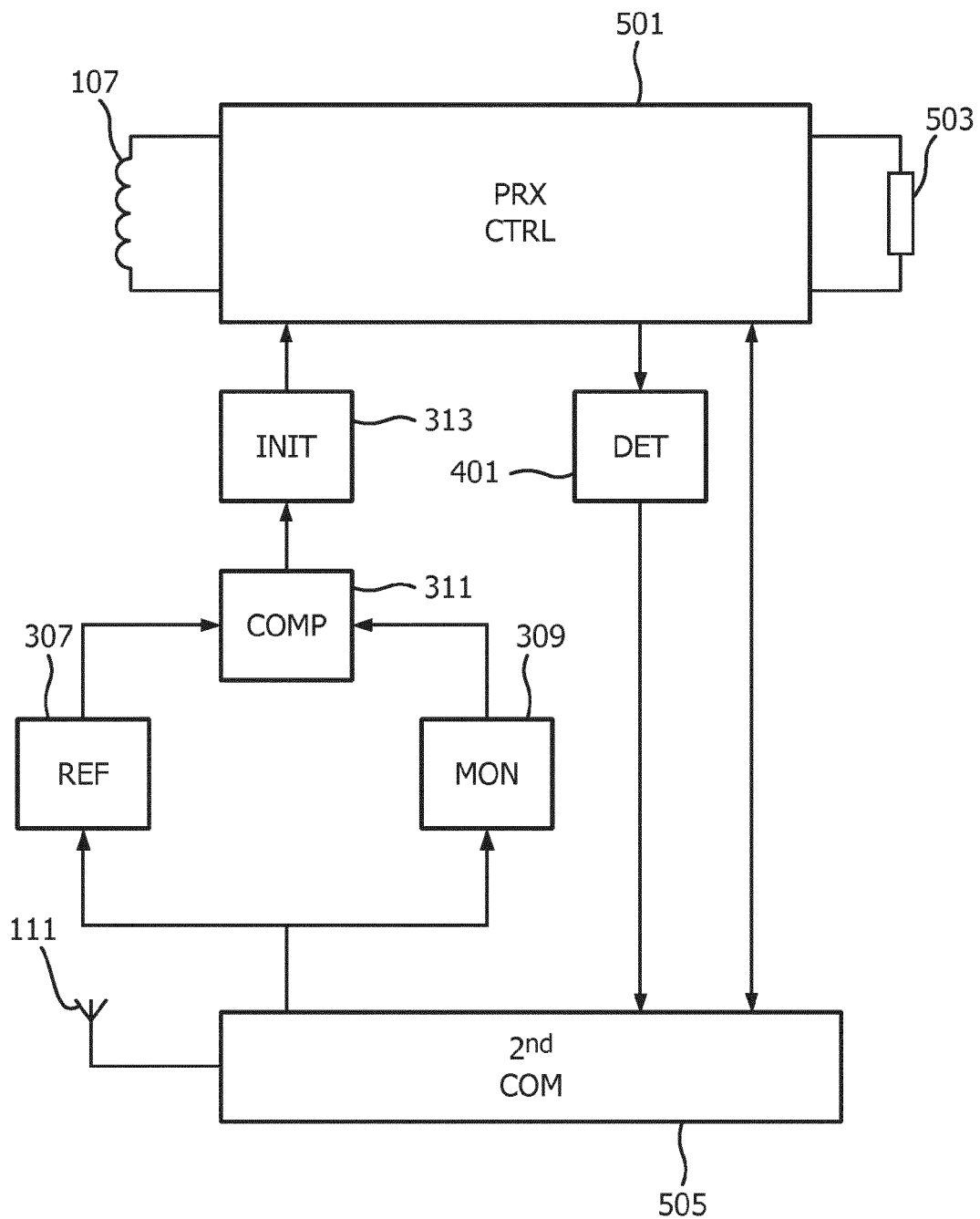
FIG. 5 illustrates an example of elements of a power receiver in accordance with some embodiments of the invention.

In some embodiments, some or all of the described functionality may alternatively or additionally be comprised in the power receiver 105. An example of this is illustrated in FIG. 5 where corresponding functional blocks are referenced by the same reference signs as in FIGS. 3 and 1 respectively.

In the example, the power receiver 105 comprises a power transfer controller 501 which is coupled to the receive coil 107 and which receives the power transfer signal. The power transfer controller 501 is further coupled to a load 503 and is capable of receiving the power transfer signal and generating a suitable power supply signal for the load 503. The power transfer controller 501 may for example comprise a (full bridge) rectifier, smoothing circuitry, and voltage or power control circuitry as will be well known to the skilled person. In many cases, the power receiver contains one or more capacitors to realize a resonance circuit with the receiver coil 107 for a chosen frequency.

The power transfer controller 501 is furthermore capable of controlling the power receiver 105 and specifically of supporting the transfer function operation including supporting the different phases of a Qi power transfer.

In the example, the power receiver 105 further comprises a second communication unit 505 which corresponds to the first communication unit 305 of the power transmitter 101. Specifically, the second communication unit 505 may be the second communication unit that the first communication unit 305 communicates with (however, it will be appreciated that the terms first and second are interchangeable, i.e. the communication unit of the power receiver 105 may be denoted as the first communication unit and the communication unit of the power transmitter could be denoted as the second communication unit).

Thus, in the example, the second communication unit 505 is a short range communication unit. Specifically, the second communication unit 505 can communicate data to the power transmitter 101 on a reverse communication link and receive data from the power transmitter 101 on a forward communication link. The communication links are short range RF communication links and accordingly the power receiver 105 also comprises an antenna 111 coupled to the second communication unit 505.

In the specific example, the second communication unit 505 is an NFC communication unit and thus the communication links are NFC communication links. The antenna 111 may specifically be an NFC planar coil.

The second communication unit 505 may thus exchange data messages with the power transmitter 101 using short range communication, and specifically using NFC communication. The second communication unit 505 may transmit data messages to the power transmitter 101 over the NFC communication link, or may receive data messages from the power transmitter 101 over the NFC communication link. Specifically, the second communication unit 505 may transmit a message to the power transmitter 101 over the reverse NFC communication link. The power transmitter 101 may then respond to this message by transmitting a response message back to the power transmitter 101 over the forward NFC communication link.

As another example, the power transmitter 101 may implement an NFC initiator and the power receiver 105 may implement an NFC target. The NFC initiator (i.e. the power transmitter 101) may send a request on the forward NFC communication link and the NFC target (i.e. the power receiver 105) may send a reply on the reverse NFC communication link. This reply may be, or may include, a confirmation that the forward NFC communication link is indeed a link to the correct power receiver 105.

The power receiver 105 furthermore comprises a reference processor 307, a monitor 309, a comparator 313 and an initiator 313 which are equivalent to those previously described for the power transmitter 101.

Thus, in the example, the power receiver 105 may measure and store a reference value for the communication signal, such as typically a signal strength indication of an RF communication signal not generated by the power receiver 105. The measured values during power transfer may be compared to this reference value, and if e.g. it is detected that the measured signal level differs from the reference level by more than a given amount, it is possible that this is due to another power transmitter communicating using NFC is close.

In response to such a detection, the initiator 313 may indicate to the power receiver controller 501 that a possible second power transmitter may be proximal. The power receiver controller 501 may accordingly reduce the power level of the power transfer signal by sending a string of power down requests or by terminating the power transfer. The initiator 313 may further (e.g. via the power receiver controller 501) initiate an entity detection which is operated by the detector 401.

In many embodiments, the entity detection may be a collision resolution or detection which identifies how many NFC communication units are possible candidates for NFC communication by the second communication unit 505. If (and only if) the resulting number equals one, the power receiver 105 may continue or restart the power transfer.

It will be appreciated that in some embodiments, the described approach may be performed in the power transmitter 101, in others it may be performed in the power receiver, and in yet others it may be performed (possibly independently) in both the power receiver and the power transmitter.

The following description will for clarity and brevity focus on the example of the functionality being implemented in (only) the power transmitter 101. However, it will be appreciated that the comments mutatis mutandis apply equally to the other embodiments.

As previously mentioned, the characteristic which is used for the comparison may be different in different embodiments.

In many embodiments, the power transmitter 101 may generate the transmit signal. In such embodiments, the characteristic may be a loading of the communication signal. For example, when a metallic object or another communication unit is positioned very closely to the antenna 109, the loading of the communication signal may increase.

For example, for NFC, planar coil antennas are typically used. An NFC communication unit (e.g. operating in passive mode) may extract power from the generated signal in a scenario where the two coils effectively correspond to a loosely coupled transformer. This additional power consumption may be detected. Similarly, a metallic object within the near field of the antenna 109 will result in eddy currents being induced and thus an increased loading of the communication signal. Such changed loadings may be detected.

In some embodiments, at least one of a voltage, current and phase of an antenna signal of the communication antenna may be detected. The presence of another object in the field of the antenna 109 will result in a change to the electromagnetic field which again will result in a change to the current, voltage and/or phase. In some embodiments, such changes relative to reference values may be detected and used to initiate an entity detection.

For example, the monitor 309 and the reference processor 307 may measure the amplitude of the voltage across the communication coil and/or the current through the communication coil.

In some embodiments, the power transmitter 101 may be arranged to evaluate values of an impedance and/or an (equivalent) inductance of the communication antenna 109 which specifically may be a coil. The impedance and the inductance are dependent on the electromagnetic environment and changes therein may accordingly be detected from measurements of these properties.

In particular, in scenarios wherein the communication signal is generated by the power receiver 105, the power transmitter 101 may proceed to measure and evaluate an indication of the signal strength of the received signal.

Specifically, the received voltage or current of the antenna 109 may be measured and compared to previously measured and stored reference value. If the measurements exceed the stored reference value by more than a given amount, this may indicate that more than one NFC signal is being received by the antenna and thus may indicate that another power receiver may possibly be close to the power transmitter 101.

Figure 6:
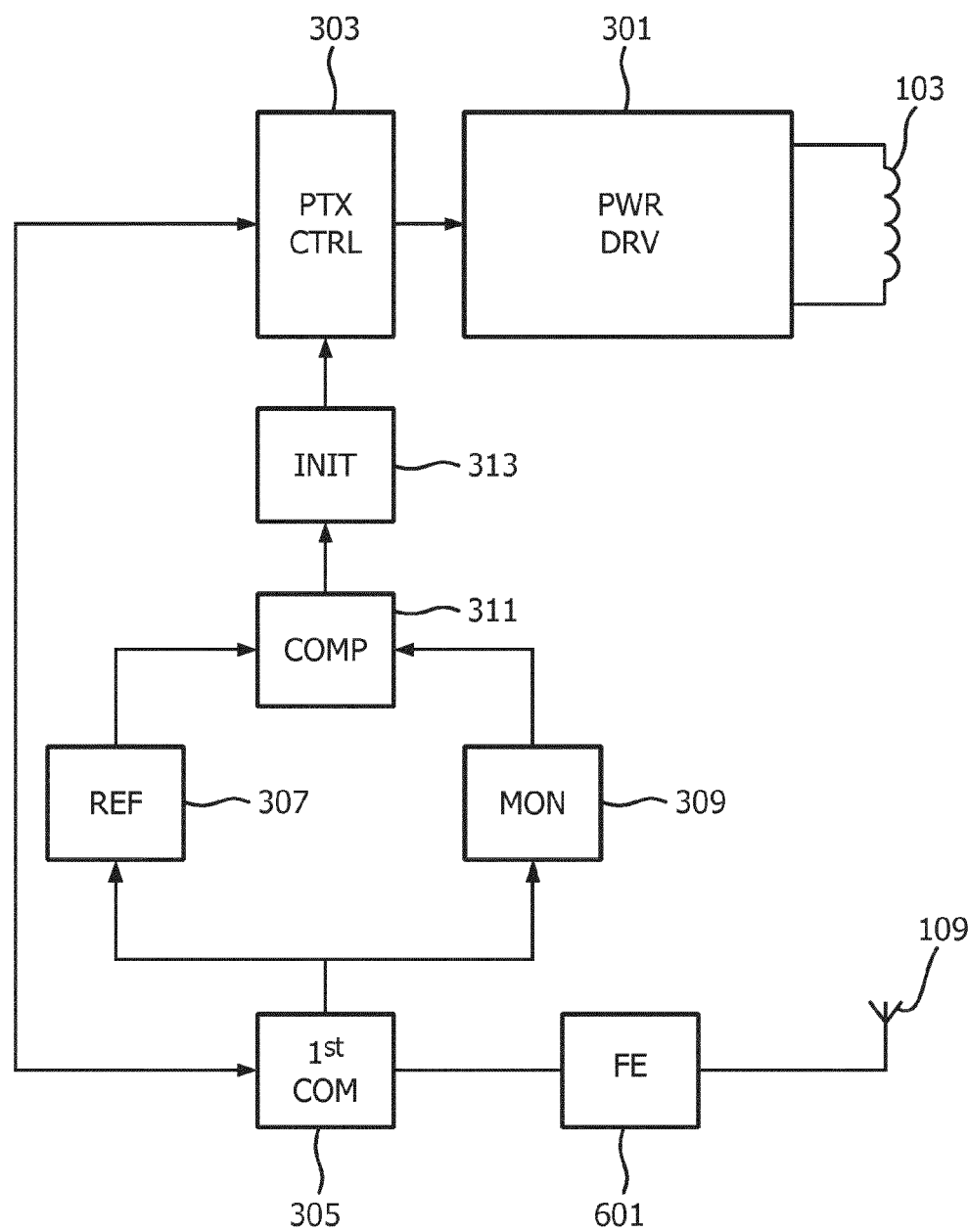
FIG. 6 illustrates an example of elements of a power transmitter in accordance with some embodiments of the invention.

As illustrated in FIG. 6, in some embodiments, the power transmitter 101 may comprise a front-end 601 between the first communication unit 305 and the antenna 109. The front end 601 may for example include filtering, impedance matching, and amplification functionality. For example, the first communication unit 305 may be considered to correspond to an integrated circuit implementing an NFC communication unit and this unit may interface with the antenna 109 via a front end comprising discrete components.

In such embodiments, the measured values and the reference value may be determined at the interface between the first communication unit 305 and the front-end 601 rather than at the interface between the front-end 601 and the antenna 109. Thus, the measured values may be indicative of a property at the interface between the first communication unit 305 and the front-end 601. Specifically, the property may be a property indicative of a loading of a transmitter output of the first communication unit 305 or a signal strength at a receive input of the first communication unit 305. In particular, a property of the signals at the transmitter output or receiver output may be used.

As a particular example, at least one of a voltage, current and phase of a signal on the receive input of the first communication unit 305 may be considered. E.g. if the measured voltage or current differs from (and in most embodiments exceeds) the reference voltage or current by more than a given amount, an entity detection may be initiated.

Alternatively or additionally, at least one of a voltage, current and phase of a signal on the transmit output of the first communication unit 305 may be considered. As another example, the impedance of the input of the front end may be used. As previously described, the impedance of the antenna 109 may change as a function of changes in the electromagnetic environment. The change in the antenna impedance will typically also reflect in a change in the impedance at the input of the front end 601, and accordingly this value may be evaluated in order to detect changes.

It will be appreciated that in different embodiments, the reference value may be generated at different times.

However, in many embodiments, the reference processor 307 may advantageously be arranged to measure and store the reference value during initialization of the power transfer phase. Specifically, the reference value may be generated to reflect the characteristic at a time prior to the start of the power transfer phase.

In some embodiments, the initialization may include a process estimating how many other communication units are present with which the first communication unit 305 may potentially communicate. If the number equals one, the reference processor 307 may proceed to generate the reference value based on the current characteristics. This may ensure that the reference value reflects a scenario where there is only one power receiver present.

Specifically, for an NFC implementation, the initialization of the power transfer phase may include an initialization of the NFC communication. This initialization may again include NFC communication activities such as technology detection, collision resolution and device activation. The determination of the reference value may in such a scenario follow the collision resolution.

Figure 7:
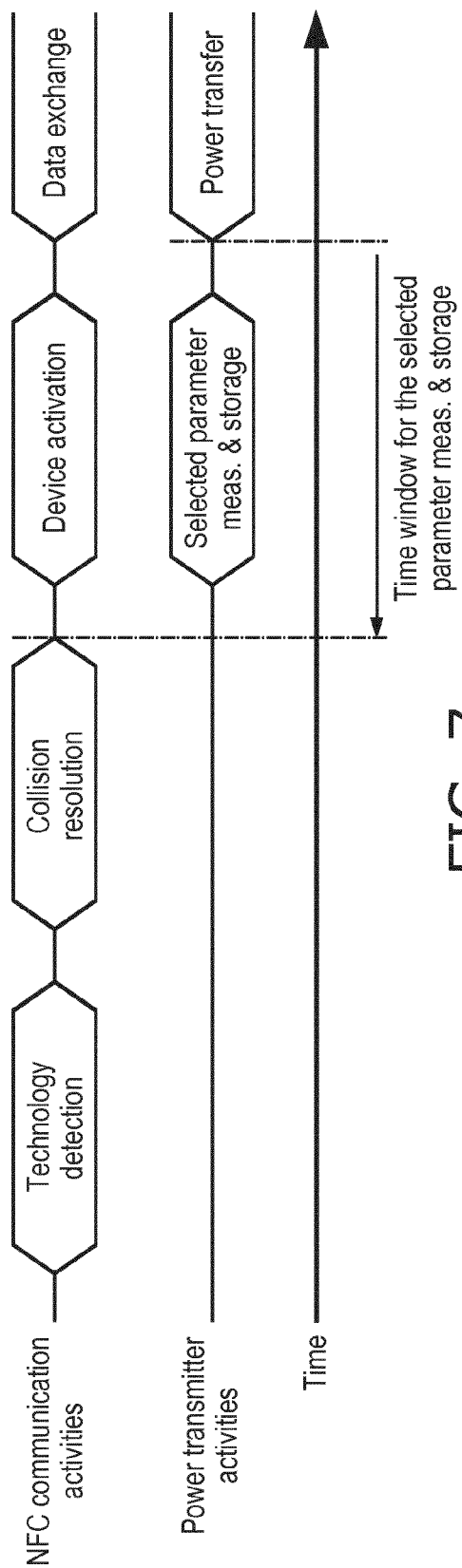
FIG. 7 illustrates an example of a possible timing diagram for operations of the power transfer system of FIG. 1.

A specific example of the possible timing is shown in FIG. 7. As illustrated, the NFC collision resolution activity is performed before the power transmitter starts transmitting power to the power receiver in the power transfer phase. In passive communication mode, this activity allows the power transmitter whether it is communicating and transmitting power to only one power receiver or not. Thus, after collision resolution, the power transmitter knows whether more than one power receivers are present within its communication range. If this is the case, the power transmitter will not proceed to the power transfer phase and will not determine a reference value. However, if only one communication candidate is present, the power transmitter proceeds to determine and store the reference value which is then used as a reference during the power transfer phase.

As shown in FIG. 7, this task can be performed just after the collision resolution activity is finished and may advantageously (in many scenarios) be completed before the power transmitter starts transmitting power in the power transfer phase.

During the power transfer phase, the power transfer signal may have a high power level and this may potentially have an effect on the measured values. Therefore, in many embodiments, it is advantageous for the conditions during determination of the measured values to match the conditions when the reference value was determined. Thus, it is desirable for the measurement conditions and environment to be as similar as possible for the reference value and measurement value determinations.

This may for example be achieved by determining the reference value prior to the power transfer phase but during a time interval in which a power transfer signal is provided to the power receiver. Specifically, when performing the measurement used to generate the reference value, the power transmitter may switch-on the power transfer signal with a power level corresponding to the expected power level during the power transfer phase.

Such an approach may be particularly suitable for scenarios wherein the power transfer signal has a relatively constant level during the power transfer phase, with the variations in the power transfer signal being due to the power control from the power receiver.

However, in other embodiments, the determination of the measured values may specifically be performed during time intervals where the power of the power transfer phase is relatively low.

Indeed, in some embodiments, the power transfer signal may have a periodically varying power, and the monitor 309 may be arranged to synchronize the determinations of the measured values to time intervals in which the power of the power transfer signal is below a threshold.

As an example, in some embodiments, the power transmitter may be arranged to generate the power transfer signal from a varying DC power transfer signal.

Figure 8:
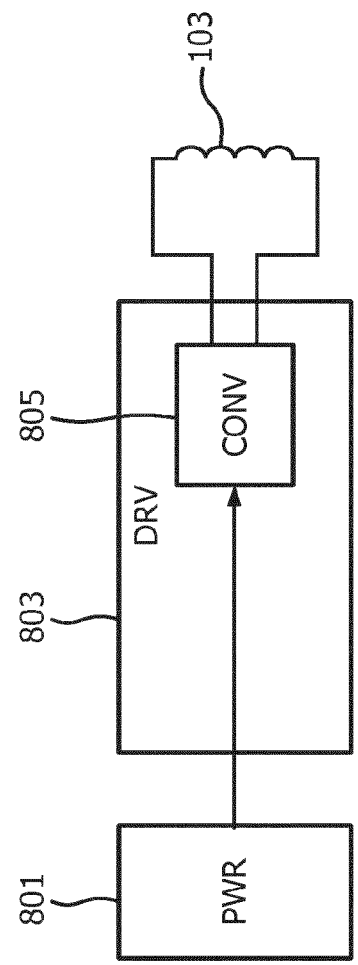
FIG. 8 illustrates an example of elements of a driver for the power transmitter of FIG. 3.
Figure 9:
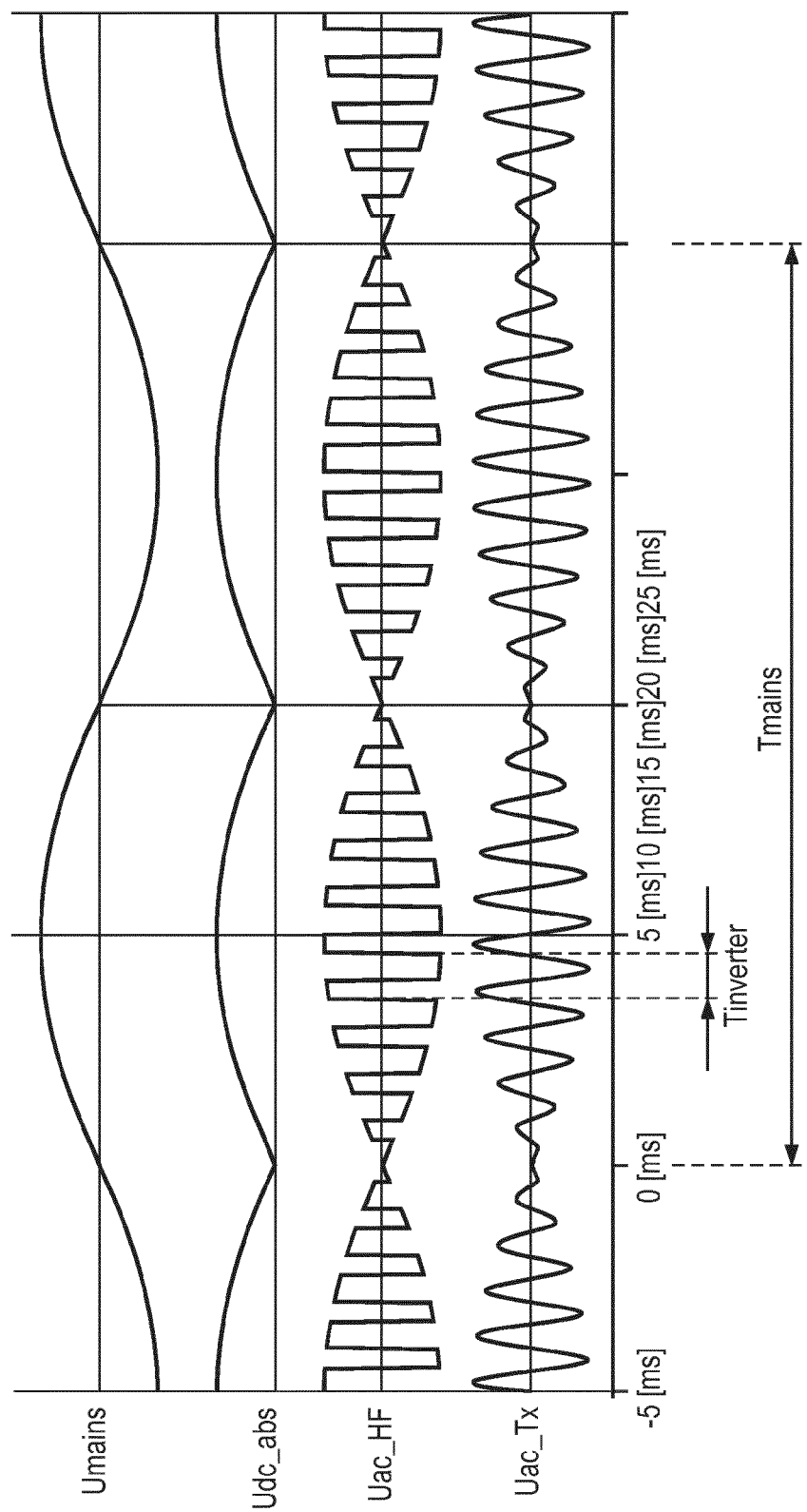
FIG. 9 illustrates an example of signals in a power transmitter.

An example of such a driver is illustrated in FIG. 8. FIG. 9 illustrates examples of signal waveforms for signals of the driver 301.

The driver 301 comprises a power source 801 which generates a power source signal. The power source 801 is specifically in the example an AC to DC converter which receives an AC signal and generates a DC signal with a varying level.

In the specific example, the power source 801 receives a mains derived sine wave signal with a frequency of 50 Hz or 60 Hz (Umains of FIG. 9). The power source 801 performs a full wave rectification of the sine wave signal. Thus a power source signal corresponding to the Udc_abs signal of FIG. 9 is generated.

In the specific example, the power source 801 does not include any smoothing capacitor and thus the power source signal corresponds to a full wave rectified sine wave signal. However, in other embodiments, the power source 801 may comprise a capacitor which smoothes the rectified signal thereby generating a power source signal with less level variation. However, in most embodiments the capacitor may be relatively small resulting in a power source signal with a level that varies substantially, at least for some loads. E.g. in many scenarios, the ripple may be at least 25% or 50% of the full load.

Thus, a DC power source signal is generated which has a varying voltage/amplitude. The varying voltage/amplitude is due to the variations of the AC level and thus the DC power source signal is a periodic signal with a period of twice the frequency of the mains, i.e. with a period of 10 msec for a 50 Hz input signal.

The power source 801 is coupled to a power transfer signal generator 803 which receives the power source signal and which from this generates a drive signal for the inductor 103 which is coupled to the power transfer signal generator 803.

The power transfer signal generator 803 specifically comprises a frequency converter 805 which is arranged to generate the frequency of the drive signal to be higher than the frequency of the power transfer signal. The frequency converter may increase a frequency of the drive signal relative to the power transfer signal. The inductor 103 is driven by a drive signal which has a substantially higher frequency than the frequency of the power source signal. The period of the power source signal is typically no less than 2.5 msec or even 5 msec (corresponding to a frequency of 400 Hz or 200 Hz respectively). However, the drive signal typically has a frequency of at least 20 kHz to 200 kHz. During power transfer intervals, the drive signal may specifically be given as:

$$d(t)=p(t)\cdot x(t)$$

where p(t) is the power source signal and x(t) is a signal with a higher frequency than p(t), and typically with a much higher frequency (e.g. typically 100 times higher or more). In order to reduce losses, x(t) is typically an AC signal, i.e. it has an average value of zero.

x(t) may for example be a sine wave. However, in the example of FIG. 8, x(t) corresponds to a square wave signal. The frequency conversion is in the example performed by a switching operation rather than by a multiplication. Specifically, the frequency converter 805 comprises a switch circuit to which the power source signal is provided as a supply voltage and which couples to the inductor 103 via switch elements that provides an effect corresponding to the multiplication of the power source signal and a frequency conversion signal x(t).

Figure 10:
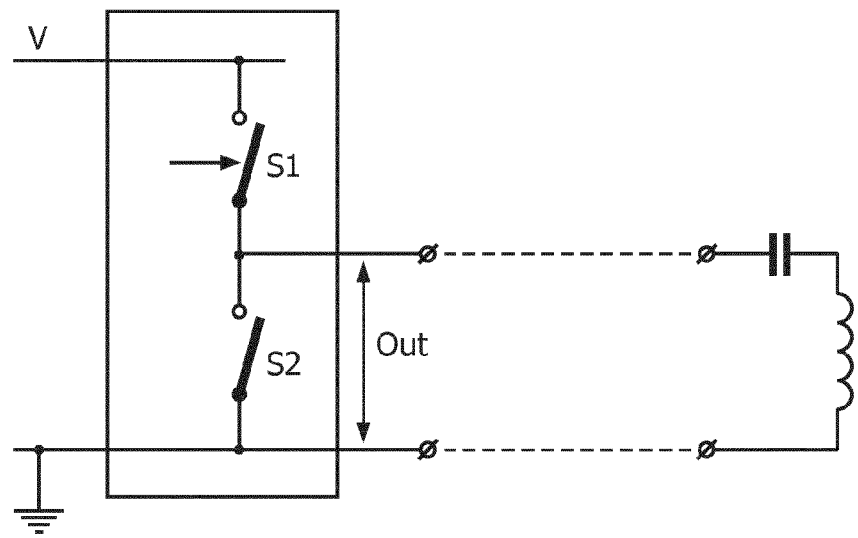
FIGS. 10 and 11 illustrate examples of a drive circuit for a transmit coil of a power transmitter.
Figure 11:
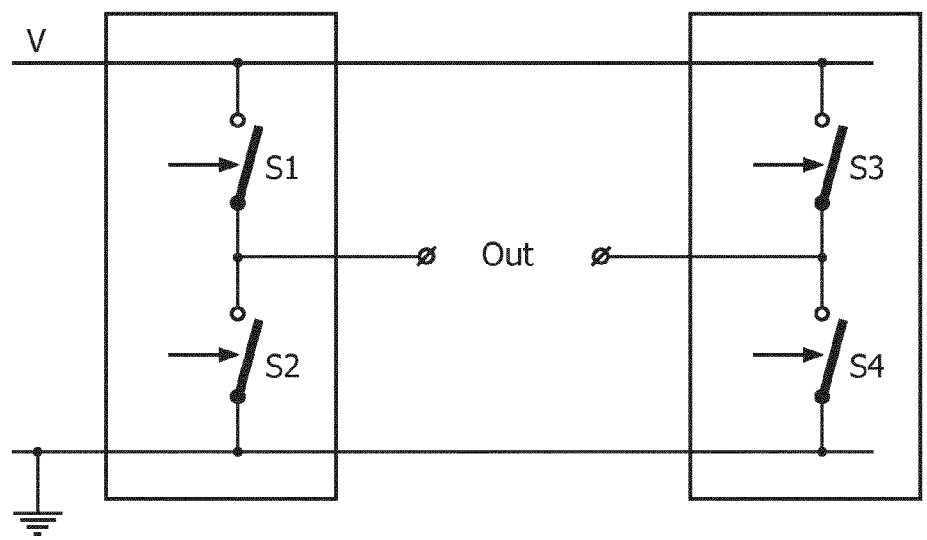

In the system of FIG. 8, the frequency converter 805 includes a drive circuit in the form of an inverter which generates an alternating signal from the varying DC Voltage of the power source signal being used as a supply voltage. FIG. 10 shows an example of a half-bridge inverter. The switches S1 and S2 are controlled such that they are never closed at the same time. Alternatingly S1 is closed while S2 is open, and S2 is closed while S1 is open. The switches are opened and closed with the desired frequency, thereby generating an alternating signal at the output. FIG. 11 shows a full-bridge inverter. The switches S1 and S2 are controlled such that they are never closed at the same time. Similarly, the switches S3 and S4 are controlled such that they are never closed at the same time. Alternatingly switches S1 and S4 are closed while S2 and S3 are open, and then S2 and S3 are closed while S1 and S4 are open, thereby creating a square wave signal at the output. The switches are opened and closed with the desired frequency.

The resulting signal Uac_HF is illustrated in FIG. 9. The application of this signal to the transmit coil 103 which typically includes a resonance signal would result in the signal Uac_TX of FIG. 9.

In such an example, the measurements used to generate the measured values may be synchronized to the periodic amplitude variations. Specifically, the measurements may synchronized to the minima of the periodic power/amplitude variation. Thus, the measurements may be made during time intervals in which the amplitude of the power transfer signal is below a given level. Specifically, the measurements may be synchronized to the zero crossings of the input supply voltage Umains provided to the driver.

Moreover the measurements may be synchronized to the timeslots in which communication takes place between power transmitter and power receiver.

This is especially applicable if the communication timeslots are taking place during the time intervals in which the amplitude of the power signal is low in order to reduce interference of the power signal on the communication link.

Such an approach may reduce the impact of the power transfer signal on the generated measured values, and may result in measurements that more closely correspond to the measurements for the reference value performed prior to the power transfer phase with no (or a low amplitude) power transfer signal being present. Accordingly, increased accuracy of the detection process is achieved.

A particular issue which faces the use of separate communication signals for communication is that these may often be influenced by the power transfer signal. In particular, unless the communication signal uses a carrier frequency which is very different from the frequency of the power signal, the close presence and high signal strength of the power transfer signal is likely to cause significant interference to the communication signal resulting in increased error rates or indeed resulting in reliable communication not being feasible. In some embodiments, such issues may be addressed by operating the power transfer signal and the communication signal using time divided multiplexing in order to separate the two signals in the time domain. Specifically, the communication may be performed during dedicated time slots of a time frame with the power transfer signal e.g. being switched off during these dedicated time slots.

Specifically, in some embodiments, the power signal is provided in a power time interval of a repeating power transfer signal time frame with the power transfer signal time frame furthermore comprising a reduced power time interval. In such embodiments, the (NFC) communication may not merely be implemented independently of the power transfer, but rather the operations may be integrated and coordinated with each other. The integration may be such that the power transfer and NFC communication operate in a synchronized and time division multiplexed arrangement.

Specifically, the power transfer may be modified such that it is not a continuous power transfer, but rather a discontinuous power transfer signal is used. Indeed, both the power transfer and the NFC communication may be arranged to operate in accordance with a repeating time frame. The repeating time frame comprises at least one time interval in which power transfer is performed. This time interval is thus referred to as a power time interval (or power transfer time interval). Each time frame furthermore comprises at least one time interval in which the power of the power transfer signal is reduced, and typically reduced to substantially zero. This time interval is accordingly referred to as a reduced power time interval.

Figure 12:
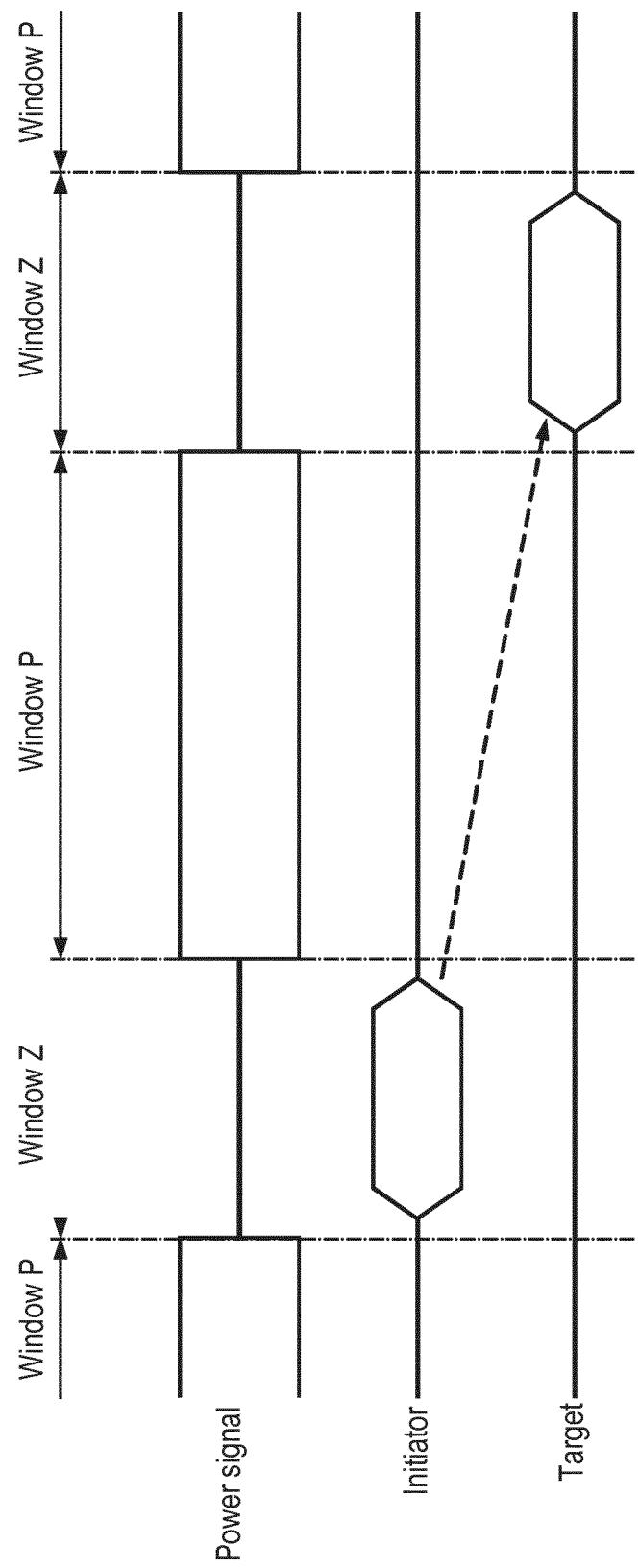
FIGS. 12 and 13 illustrate examples of time frames of a power transfer signal of a power transfer system.

FIG. 12 illustrates an example of a timing diagram for such a system.

In the example, each repeating time frame comprises one power time interval and one reduced power time interval. In the example, the power of the power transfer signal is reduced to zero in the reduced power time interval. In FIG. 12 the power time interval is referred to as "Window P" and the reduced power time intervals are referred to as "Window Z".

It will be appreciated that in some embodiments or scenarios, the power of the power transfer signal may not be reduced to zero in the reduced power time intervals but may be limited to a lower level being a level that is lower than the maximum possible power of the power transfer signal during the power time intervals, such as e.g. by restricting the power level to a power level for which the interference caused to the NFC communication is known to be acceptable.

In such a system, the NFC communication is not merely performed to meet the NFC communication standard but is also performed to be integrated with the power transfer operation, and specifically the NFC communication is performed synchronously with the time frame of the power transfer signal, i.e. it is synchronized with the power variations of the power transfer signal.

Specifically, the first communication unit 305 may be arranged to synchronize the short range (NFC) communication to the power transfer signal time frame such that the short range (NFC) communication is restricted to the reduced power time intervals.

Similarly, the communication unit of the power receiver 105 may be arranged to synchronize the short range (NFC) communication to the power transfer signal time frame such that the short range (NFC) communication is restricted to the reduced power time intervals.

Thus, the first and second communication units 305, 505 may operate such that the communication over the NFC communication link is limited to the reduced power time intervals. Specifically, the transmission of a data message is performed only during a reduced power time interval and no transmissions of data occur outside of these (although in some embodiments the NFC transmitter of one of the first and second communication unit 305, 405 signal may e.g. continuously transmit an unmodulated carrier e.g. for powering a passive NFC communication unit).

For example, NFC communication may be performed in a passive mode wherein the target is a passive NFC communication entity that does not comprise functionality for powering itself. In the passive mode, the initiator generates an RF field and the target gets powered by this field. The target responds by modulating the existing RF field. As previously mentioned, the initiator can be implemented on the power transmitter side or on the power receiver side. However, if the target is placed on the power receiver side, the target could be directly powered from the initiator. This solution could prevent the implementation of an internal power supply (e.g. a battery) and the generation of carrier signal (i.e. a local oscillator) in the power receiver.

In some embodiments, the first communication unit 305 and the second communication unit 505 are arranged to synchronize the transmission of a data message to the reduced power time interval. Similarly, in some embodiments, the first communication unit 305 and the second communication unit 505 are arranged to synchronize the reception of a data message to the reduced power time interval. This may ensure that only data messages transmitted in the correct time intervals can be received. This may be used to reduce power and/or to further reduce the risk of data messages being received from other sources than the intended power receiver 105.

In most embodiments, the duration of the power time interval (or the combined duration of the power time intervals in case there is more than one) within each time frame is longer than the reduced power time interval (or the combined duration of the reduced power time intervals in case there is more than one) within each time frame. In many embodiments, it is at least 2, 3, 5 or even 10 times longer. In embodiments, wherein each time frame comprises only one power time interval and one reduced power time interval, the duty cycle (for the reduced power time interval) is typically no more than 20%, 10% or even 5%.

This may typically be advantageous by providing sufficient time for establishing a communication channel of sufficient capacity without unacceptably impacting on the power transfer.

The time frame timing will typically be readily available in the power transmitter 101 as the same time base that is used to control (e.g. gate) the power transfer signal can be provided to the first communication unit 305. At the power receiver 105, the timing can be derived from the power transfer signal itself by detection of the transitions between the power time intervals and the reduced power time interval based on the power level variations (e.g. using a Schmidt trigger circuit). For example, a first phase locked loop may be based on falling edge transitions (i.e. from power time interval to reduced power time interval) to generate a time base signal synchronized with the transitions from power time intervals to reduced power time intervals. A second phase locked loop may be based on rising edge transitions (i.e. from reduced power time intervals to power time intervals) to generate a time base signal synchronized with the transitions from reduced power time intervals to power time intervals. Then two generated signals may have a duty cycle of e.g. 50% and time base signal synchronized with both transitions can be generated by combining the two generated signals (using e.g. an OR or AND function).

FIG. 12 further illustrates an example of synchronized NFC communication. In the example, an initiator (which in different embodiments and scenarios may be either the power transmitter or the power receiver) transmits a data message in a first reduced power time interval. A target (which in different embodiments and scenarios may be either the power receiver or the power transmitter) receives the data message in the first reduced power time interval. In the subsequent reduced power time interval, the target responds by transmitting a response message to the initiator.

Thus, in the example, the communication units 305, 505 are arranged to reply to a data message where the reply is transmitted in a subsequent reduced power time interval to the one in which the data message is received.

Thus in the example, each reduced power time interval provides communication in one direction. Following a data message being transmitted in one direction, the receiving part transmits a response message in the following reduced power time interval.

Due to the data exchange activity operating time multiplexed with the power transfer, the available time for transmitting data messages is limited. This may reduce the amount of data which can be transmitted, and specifically the amount of data which can be transmitted within one reduced power time interval. The transmission in only one direction in each time interval may often provide a more efficient communication with lower overhead thereby allowing a higher overall data rate.

However, in some embodiments it may be desirable to have a faster response to data messages.

In some embodiments, the communication units 305, 505 may be arranged to reply to a data message in the same reduced power time interval in which the data message is received.

Using such a time division approach, the impact of the power transfer signal on the communication signal may be reduced and typically may become negligible. However, in some embodiments, the reduced power signal efficiency due to the reduced power may be considered disadvantageous. However, in embodiments wherein the power signal has a varying amplitude, the communication time intervals may be synchronized to time instants at which the amplitude of the power transfer signal is below a threshold, and specifically may be synchronized to the minima of the (absolute value of the) amplitude.

Figure 13:
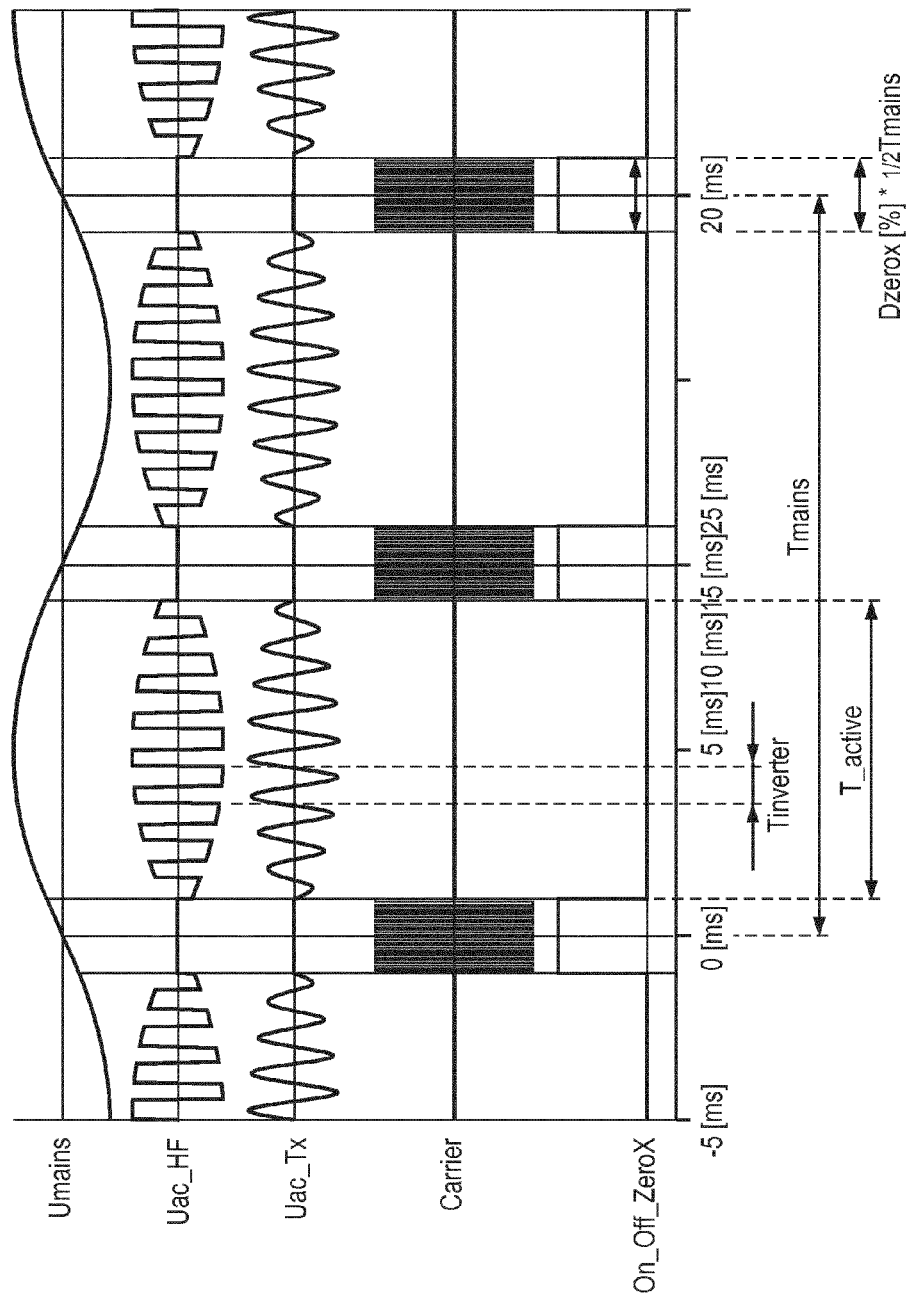

An example of the approach to the exemplary power transmitter described with reference to FIGS. 9 to 11 is shown in FIG. 13. In the examples, the amplitude of the power transfer signal is reduced to zero in repeating time intervals that are synchronized to the absolute minima/zero crossings of the provided supply voltage Umains. During these time intervals (indicated by the signal On_Off_ZeroX), the communication signal (denoted by the signal Carrier) is generated (and specifically the signal Carrier may represent the NFC signal).

The exact timings of the time frame may depend on the individual embodiment. However, typically the communication intervals will be relatively short, e.g. often less than 5 msec, and typically around 2 msec.

These short durations make it impractical to perform a full detection of other communication candidates. For example, the time required to perform a full NFC collision detection/resolution substantially exceeds the duration of typical communication time intervals.

As previously described, the presence of more than one communication candidate may potentially result in undesired operation, and therefore the lack of time to perform full detection of other communication candidates can be problematic in some scenarios.

However, the present example applies the previously described approach of comparing measured values to a reference value. For example, following a full NFC collision resolution performed as part of initializing a power transfer, the system may store a reference value for a characteristic of the communication signal. During each communication time interval of the subsequent power transfer phase, the system may generate a corresponding measured value and compare it to the stored reference value. This measured value does not require a full collision detection algorithm but can typically be determined quickly and reliably, and typically well within the duration of a communication time interval. Thus, a fast but perhaps less accurate detection of other communication units can be performed in each communication time interval. If the comparison indicates that there may potentially be another communication unit present, the system can proceed to terminate the power transfer phase and initiate a full NFC collision detection/resolution.

Thus, the described approach may support and facilitate the use of a time frame with dedicated (short) communication time intervals, thereby allowing a more reliable communication while still providing robust operation.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality. Reference signs in the claims are provided merely as a clarifying example shall not be construed as limiting the scope of the claims in any way.

The invention claimed is:

1. An apparatus for a wireless power transfer system including a power transmitter and a power receiver, the power transmitter being arranged to generate a wireless inductive power transfer signal for powering the power receiver during a power transfer phase, the apparatus comprising:
    a first communication unit for communicating with a second communication unit of a first entity using an electromagnetic communication signal, the first entity being one of the power receive and the power transmitter;
    a reference processor for measuring and storing a reference value of a characteristic of the communication signal;
    a measurement unit for determining a measured value of the characteristic of the communication signal during the power transfer phase;
    a comparator for comparing the measured values to the reference value; and
    an initiator for triggering an entity detection process if the comparison indicates that a measured value and the reference value do not meet a similarity criterion, the entity detection process being arranged to detect a presence of an entity other than the first entity.

2. The apparatus of claim 1, further comprising a detector arranged to perform the entity detection process, and wherein the entity detection process comprises a detection of a third communication unit.

3. The apparatus of claim 1, wherein the reference processor is arranged to measure and store the reference value during an initialization of the power transfer phase.

4. The apparatus of claim 1, further comprising a detector being a communication candidate detector arranged to detect a number of candidate communication units that can be communicated with by the first communication unit, and wherein the reference processor is arranged to store the reference value only if the number of candidate communication units equals one.

5. The apparatus of claim 1, wherein the first communication unit is arranged to communicate with the second communication unit using short range communication, the short range communication having a range not exceeding 30 cm.

6. The apparatus of claim 5, wherein the short-range communication is a Near Field Communication.

7. The apparatus of claim 1, wherein the power transfer signal has a periodically varying power, and the measurement unit is arranged to synchronize the determinations of the measured values to time intervals in which the power of the power transfer signal is below a threshold.

8. The apparatus of claim 1, wherein the first communication unit is arranged to generate the communication signal, and the characteristic reflects a loading of the communication signal.

9. The apparatus of claim 1, wherein the communication signal is not generated by the first communication unit, and the reference value is indicative of a signal strength of the communication signal.

10. The apparatus of claim 1, further comprising a power restrictor for restricting a power level of the power transfer signal in response to at least one of detecting the presence of the entity other than the second entity and detecting that the comparison indicates that the measured value and the reference value do not meet the similarity criterion.

11. The apparatus of claim 1, wherein the apparatus is the power transmitter and the second entity is the power receiver.

12. The apparatus of claim 1, wherein the apparatus is the power receiver and the second entity is the power transmitter.

13. The apparatus of claim 1, further comprising a communication antenna for communicating with the second communication unit, and wherein the measured values are indicative of at least one of a voltage, current and phase of an antenna signal of the communication antenna.

14. The apparatus of claim 1, further comprising a communication antenna for communicating with the second communication unit, and wherein the measured values are indicative of at least one of an impedance and an inductance of the communication antenna.

15. The apparatus of claim 1, further comprising a communication antenna for communicating with the second communication unit and a front-end for coupling the first communication unit to the communication antenna; and wherein the measured values are indicative of a property at an interface between the first communication unit and the front-end.

16. The apparatus of claim 15, wherein the property is at least one of:
- an impedance of the front-end;
- at least one of a voltage, current and phase of a signal on a receive input of the first communication unit; and
- at least one of a voltage, current and phase of a signal on a transmit output of the first communication unit.

17. The apparatus of claim 1, wherein the power transfer signal is provided in a power time interval of a repeating power transfer signal time frame, the power transfer signal time frame furthermore comprising a reduced power time interval; and wherein the first communication unit is arranged to synchronize the communication to the power transfer signal time frame such that short range communication is restricted to the reduced power time intervals.

18. A method of operation for a wireless power transfer system including a power transmitter and a power receiver, the power transmitter being arranged to generate a wireless inductive power transfer signal for powering the power receiver during a power transfer phase, the method comprising:
- communicating by a first communication unit with a second communication unit of a first entity using an electromagnetic communication signal, the first entity being one of the power receiver and the power transmitter;
- measuring and storing a reference value of a characteristic of the communication signal;
- determining a measured value of the characteristic of the communication signal during the power transfer phase;
- comparing the measured values to the reference value; and
- triggering an entity detection process if the comparison indicates that a measured value and the reference value do not meet a similarity criterion, the entity detection process being arranged to detect a presence of an entity other than the first entity.

* * * * *